United States Patent [19]
Terashita et al.

[11] Patent Number: 5,463,470
[45] Date of Patent: Oct. 31, 1995

[54] METHODS OF COLLECTING PHOTOMETRIC IMAGE DATA AND DETERMINING LIGHT EXPOSURE BY EXTRACTING FEATURE IMAGE DATA FROM AN ORIGINAL IMAGE

[75] Inventors: Takaaki Terashita; Hiroaki Nakamura, both of Kanagawa, Japan

[73] Assignee: Fuji Photo Film Co., Ltd., Kanagawa, Japan

[21] Appl. No.: 958,163

[22] Filed: Oct. 8, 1992

[30] Foreign Application Priority Data

Oct. 9, 1991 [JP] Japan .................................. 3-262232
Oct. 9, 1991 [JP] Japan .................................. 3-262233

[51] Int. Cl.$^6$ .................................. H04N 1/40; G03F 3/08; G06K 9/46
[52] U.S. Cl. .................... 358/298; 358/520; 358/522; 382/165
[58] Field of Search .................... 358/298, 296, 358/401, 518, 520, 522; 346/108, 157, 160; 382/16, 17, 18

[56] References Cited

U.S. PATENT DOCUMENTS

| | | | |
|---|---|---|---|
| 4,847,641 | 7/1989 | Tung | 346/160 X |
| 5,016,173 | 5/1991 | Kenet et al. | 382/22 X |
| 5,119,184 | 6/1992 | Hiratsuka et al. | 358/75 |
| 5,128,711 | 7/1992 | Terashita et al. | 358/76 X |
| 5,142,593 | 8/1992 | Kasano | 382/18 X |
| 5,177,602 | 1/1993 | Fujimori | 358/80 |
| 5,278,921 | 1/1994 | Nakamura et al. | 382/18 |
| 5,309,228 | 5/1994 | Nakamura | 358/500 |

FOREIGN PATENT DOCUMENTS

| | | | |
|---|---|---|---|
| 52-156624 | 12/1977 | Japan | G03B 27/72 |
| 52-156625 | 12/1977 | Japan | G03B 27/72 |
| 53-12330 | 2/1978 | Japan | G03B 27/72 |
| 53-145620 | 12/1978 | Japan | G03B 27/76 |
| 53-145621 | 12/1978 | Japan | G03B 27/76 |
| 53-145622 | 12/1978 | Japan | G03B 27/76 |
| 2-287531 | 11/1990 | Japan | G03B 27/80 |

*Primary Examiner*—Peter S. Wong
*Assistant Examiner*—Eric Frahm
*Attorney, Agent, or Firm*—Sughrue, Mion, Zinn, Macpeak & Seas; Richard C. Turner; Marc Kaufman

[57] ABSTRACT

A method of determining light exposure is provided to read information in relation to a color original image and dividing the color original image into many picture elements to analyze the respective picture elements into three color light of red light, green light and blue light for photometry, find a histogram in relation to hue value depending upon data obtained by the photometry and divide the found histogram for each crest. Further, the method is provided to decide to which of the divided crests the respective picture elements of the color original image belong so as to distribute the picture element into a corresponding cluster, and divide the color original image for each cluster, select the most adaptable region to information in relation to the color original image which is read from the divided region as a feature image region. The method is still further provided to determine the light exposure to copy material depending upon image data in the feature image region. Therefore, the image data of the feature image region is extracted as the feature image data, and the light exposure is determined depending upon the extracted data to create a printed image. As a result, a feature image portion can be printed in proper density, or in proper density and color.

19 Claims, 16 Drawing Sheets

ORIGINAL PICTURE

60: IMAGE FRAME

METHODS OF COLLECTING PHOTOMETRIC IMAGE DATA AND DETERMINING LIGHT EXPOSURE BY EXTRACTING FEATURE IMAGE DATA FROM AN ORIGINAL IMAGE

BACKGROUND OF THE INVENTION

Field of the Invention

The present invention relates to methods of collecting photometric image data and determining light exposure. More specifically, the present invention relates to a method of collecting photometric image data which is used when a color original image is divided into a large amount of picture elements, or pixels, for photometry of the color original image in order to copy the color original image on color copy material or black-and-white material, and relates to a method of determining the light exposure by extracting feature image data such as density data of a person's face when copying the color original image on the color copy material or the black-and-white copy material.

Background Information

It is necessary to expose a color original image with appropriate light exposure in order to copy the color original image on copy material. In conventional methods, the color original image is divided into hundreds of picture elements so that the light exposure desired for copying the color original image can be determined depending upon photometric data which is obtained by photometry per the color original image.

In viewing a portrait, primary attention is paid to the person's face. Therefore, it is necessary to print of the person's face in appropriate color and density in order to provide a which is superior in quality.

For printing the person's face in appropriate color and density, there has been proposed a method of extracting the person's face by extracting flesh-colored data (see Japanese Patent Application Laid-Open Nos. 52-156624, 52-156625, 53-12330, 53-145620, 53-145621 and 53-145622). In these publications, the color original image is divided into many photometric points and the respective photometric points are divided into three colors, i.e., R (red), G (green) and B (blue) for photometry of the photometric points. It is decided by calculating depending upon the photometric data whether each color of the photometric points is within the range of flesh-color. Subsequently, a cluster of the photometric points which are decided to be in the range of flesh-color are defined as density data of the face.

Another method is also disclosed in Japanese Patent Application Laid Open No. 2-287531 (U.S. patent application Ser. No. 07/515,897, U.S. Pat. No. 5,128,711). In this publication, the cluster of the photometric points which are decided to be in the range of flesh-color is compared with a face size. The face size is estimated on a photographic original image depending upon focal length data and subject distance data. Based on the comparison, it is decided whether or not the cluster of the photometric points is the face region.

However, since the color within the range of flesh-color is defined as the density data of the face in the conventional method, portions except the face having the flesh-color or color similar to the flesh-color, i.e., ground, a branch of a tree, clothes or the like may be also extracted as density data of the face. As a result, data may be extracted inaccurately.

In addition to the method set forth above, a method is known in which it is decided that the color original image is the face if the respective pixels having the same density information form a circle. In the method, a region of the face may be extracted inaccurately because a shape of the exposed flesh-color portion of the face is varied depending upon a condition in photographing, and the shape of the exposed flesh-color portion may not be circular, i.e., the face may be partially obscured.

Further, if the face has a small size, it is necessary to divide the color original image into several tens of thousands of picture elements for photometry when determining light exposure by extracting the person's face.

However, when the color original image is finely divided for the photometry, the photometry with the same size of the picture element is naturally provided for positions irrelevant to a main image such as face in the color original image. If the face has a small size, photometric data unnecessary for determination of the light exposure is increased. Accordingly, disadvantages may occur in analysis of the color original image and the face may be erroneously extracted. On the other hand, if the face has a large size, as the same photometric data obtained from the face position increase, fine photometry would be naturally provided for the positions unnecessary for determination of the light exposure, i.e., the positions except the face. As a result, efficiency of determining the light exposure is reduced.

SUMMARY OF THE INVENTION

In order to overcome the problems set forth hereinbefore, it is an object of the present invention to provide a method of collecting photometric image data in which the optimal photometric data can be efficiently collected irrespective of a size of a main image such as person's face in a color original image.

In order to overcome the problems set forth hereinbefore, it is another object of the present invention to provide a method of determining light exposure in which a feature image region such as data of the person's face can be obtained from the color original image with high accuracy, and the light exposure for a copy material can be determined depending upon feature image data in the feature image region.

In addition to the above objects, it is still another object of the present invention to provide a method of determining the light exposure in which the main image region can be obtained by the optimal photometric data irrespective of a image size of the main image such as the person's face in the color original image, and the light exposure for the copy material can be efficiently determined depending upon the photometric data of the obtained main image region.

In a first aspect of the present invention, a method of determining light exposure comprises the steps of: reading information in relation to a color original image and dividing the color original image into many picture elements to analyze the respective picture elements into three color light, i.e., red light, green light and blue light for photometry; finding a histogram in relation to hue value depending upon data obtained from the photometry and dividing the found histogram for each crest; deciding to which of the divided crests the respective picture elements of the color original image belong so as to distribute the picture element into a corresponding cluster, and dividing the color original image for each cluster; selecting the most adaptable region to information in relation to the color original image which is read from the divided region as a feature image region; and determining the light exposure to copy material depending upon image data in the feature image region.

According to the first aspect as set forth above, the color original image is divided into many picture elements, and the respective picture elements are analyzed into three color light, i.e., red light, green light and blue light for the photometry. On the other hand, the information in relation to the color original image is read. As described hereinbefore, the information in relation to the color original image may be any one of size information representing the size of the main image, size related information for finding the size of the main image, region information representing the image region where there is the main image, and information representing a focused position in the color original image of the focused image. Further, at least one of the size information, the size related information and the region information may be photographing information which is recorded or stored by a photographing apparatus in photographing. The photographing information can be recorded or stored in a recording apparatus provided for the photographing apparatus and/or a recording medium in which the color original image is recorded. Subsequently, the histogram of the hue value is found depending upon data obtained by the photometry. The found histogram is divided for each crest with a trough or a foot portion of the histogram as a border. Thereby, a range of the hue value is determined for each crest. Next, it is decided to which of the divided crests the respective picture elements belong so as to distribute many picture elements into a cluster corresponding to the divided crest. The color original image is then divided into a region corresponding to the divided crest. At the time, the picture elements contained in different clusters are never distributed into the same region though the picture elements contained in one cluster may be distributed into different regions. Therefore, the color original image will be divided by a region containing the picture element having the hue value in the range of the hue value divided by the histogram. Accordingly, the picture element having the hue value in the predetermined range will be contained in one of the regions on the color original image. A region selected as a feature image region is the most adaptable region to information in relation to the color original image which is read from a region representing a feature of the image. The image data of the selected feature image region is then extracted as feature image data.

If there are changes of types of negative film, types of light source, changes with elapsed time and differences of development of the negative film and the like, a tone of the color original image is uniformly varied in the entire image plane. The position of the picture elements is simply varied on the histogram and the clusters can be maintained even if the tone is varied in such a way. Consequently, the divided region of the color original image are not varied for all the variation of the tone. Therefore, according to the present invention, it is possible to extract density data of a person's face even if the tone and color range of the color original image are varied due to changes of types of negative film, types of light source, changes with elapsed time and differences of development of the negative film and the like.

On the other hand, if the size information is used as the information in relation to the color original image, it is possible to select a region to be extracted according to the size of the main image, and to extract data of the selected region as the feature image data of the main image. If using the region information, it is possible to select a region to be extracted depending upon the image region where there is the main image, and to extract data of the region as the feature image data of the main image. The focused position of the color original image has high probability of existence of the main image. Accordingly, an extracted region of the main image can be easily specified by using information representing the focused position. As a result, the feature image data of the main image can be extracted in a short time. Further, at least one of the size information, the size related information and the region information of the main image is recorded or stored as the photographing time information by the photographing apparatus in photographing. It is possible to specify the image size, the image magnification and the region in photographing the main image by using these information. Therefore, the feature data of the main image can be easily extracted.

The light exposure is determined depending upon the feature image data extracted as described above. Thus, a printed image can be created so as to print a feature image portion in appropriate density, or in appropriate density and color.

It possible to determine the light exposure required for printing in appropriate density by using at least one of three color data (red, green and blue) of the feature image portion. Further, it is possible to determine the light exposure required for printing in appropriate density and color by using the three color data.

In a second aspect of the present invention, a method of determining light exposure comprises the steps of: reading information in relation to a color original image and dividing the color original image into many picture elements to analyze the respective picture elements into three color light, i.e., red light, green light and blue light for photometry; finding a two-dimensional histogram of one of a histogram of hue value and the hue value with respect to saturation value depending upon data obtained by the photometry and dividing the found two-dimensional histogram for each crest; deciding to which of the divided crests the respective picture elements of the color original image belong so as to distribute the picture element into a corresponding cluster, and dividing the color original image for each cluster; selecting the most adaptable region to information in relation to the color original image which is read from the divided region as a feature image region; and determining the light exposure to copy material depending upon image data in the feature image region.

It is assumed that the feature image serving as a feature portion of the image has the same or substantially same hue as hue of another position. In this case, it may be impossible to discriminate between the feature image and another position if the color original image is divided depending upon only the histogram of the hue value. Therefore, in the second aspect, the saturation value is further provided in addition to the hue value to find a two-dimensional histogram in relation to the hue value and the saturation value. The two-dimensional histogram is divided for each crest to divide the color original image as set forth above. As described hereinbefore, a region selected as the feature image region is the most adaptable region to information in relation to the color original image which is read from the divided region. The image data of the feature image region is extracted as feature image data so that the light exposure can be determined depending upon the extracted feature image data.

It is possible to extract the feature image data by using the hue value and the saturation value as described above even if there is a region including the same or substantially same hue as the hue of the feature image among the feature image data.

The most attention is paid to a person's face when enjoying a portrait. Preferably, it is decided whether or not the divided regions of the color original image is the person's face, and data of the region decided to be the person's face is extracted as the feature image data. In this case, it is possible to extract the feature image data, i.e., data of the person's face depending upon the two-dimensional histogram of the hue value. Otherwise, it is also possible to extract the data of the person's face depending upon the two-dimensional histogram in relation to the hue value and the saturation value. The person's face has the tone similar to tone of flesh-colored portion of ground, branch or the like, but the person's face has saturation different from saturation of the flesh-colored portion in many cases. Consequently, if the data of the person's face is extracted depending upon the two-dimensional histogram in relation to the hue value and the saturation value, it is possible to extract the data of the person's face in an image containing the face, the ground, the branch and the like.

The data extracted as the feature image data may be data other than the data of the person's face.

A third aspect of the present invention provides a method of determining light exposure in which a color original image is divided into many picture elements, the respective picture elements are analyzed into three color light, i.e., red light, green light and blue light by the divided picture element for photometry, and the light exposure for copying the color original image to copy material is determined depending upon photometrical image data. The method comprises the steps of: determining a size of one picture element depending upon information in relation to a size of a main image so as to collect image data; classifying the collected image data into a cluster having any one of the same or similar hue value, and the same or similar hue value and the same or similar saturation value; finding an image feature amount from the image data of a region in the vicinity of each region of the color original image so as to correspond to each classified cluster; determining a main image region from the found image feature amount; and determining the light exposure to copy material depending upon the image data of the determined main image region.

In the third aspect, the size of the one picture element is determined depending upon the information in relation to the size of the main image. In the determined size of the one picture element, the respective picture elements of the color original image are analyzed into three color light, i.e., red light, green light and blue light for the photometry to collect photometric image data. The information in relation to the size of the main image may include the size information representing a size of a main object, magnification information representing image magnification of a photographing optical system and distance information representing a distance from a lens to an object in photographing. It is possible to specify a size of the main image by using at least one of these information. Accordingly, it is further possible to specify the size of the picture element so as to be enough to obtain necessary information from the photometric image data. Subsequently, the collected image data are classified into a cluster having the same or substantially same hue value, or a cluster having the same or substantially same hue value and saturation value. Further, the color original image is divided so as to corresponding to the respective classified clusters. Thus, the image feature amount is found from the image data of the respective divided regions of the color original image and regions in the vicinity of the divided regions. The image data for finding the image feature amount is obtained from the picture element having the enough size to obtain the necessary information as specified above. Consequently, the optimal image data can be obtained according the size of the main image. The main image region is determined depending upon the found image feature amount. The light exposure to the copy material is determined depending upon the image data of the determined main image region. In such a way, after determining the size of the one picture element, the image data is obtained to determine the main image region. Therefore, it is possible to obtain photometric data formed with the optimal picture element number irrespective of the size of the main image. As a result, the main image region can be determined with higher accuracy, and the light exposure having enhanced color reproducibility of the main image can be determined.

A fourth aspect of the present invention provides a method of collecting photometric image data in which a color original image is divided into many picture elements, the respective picture elements are analyzed into three color light, i.e., red light, green light and blue light by the divided picture element for photometry to collect photometric image data. The method comprises the steps of: determining a size of one picture element depending upon information in relation to a size of a main image; and collecting image data depending upon the determination.

In the fourth aspect, the size of the one picture element is determined depending upon the information in relation to the size of the main image. In the determined size of the one picture element, the respective picture elements of the color original image are analyzed into three color light, i.e., red light, green light and blue light for the photometry to collect the photometric image data. The information in relation to the size of the main image may include size information representing a size of a main object, magnification information representing image magnification of a photographing optical system, and distance information representing a distance from a lens to an object in photographing. The size of the main image can be specified by using at least one of these information. Hence, it is possible to determine the one image picture appropriately so as to have the enough size to obtain the necessary information from the photometric image data. Therefore, the optimal photometric data can be obtained irrespective of the size of the main image in the color original image.

DESCRIPTION OF THE PREFERRED EMBODIMENTS

Preferred embodiments of the present invention will be described in detail with reference to the accompanying drawings. In the embodiment, the present invention is applied to an auto-printer.

Figure 1:
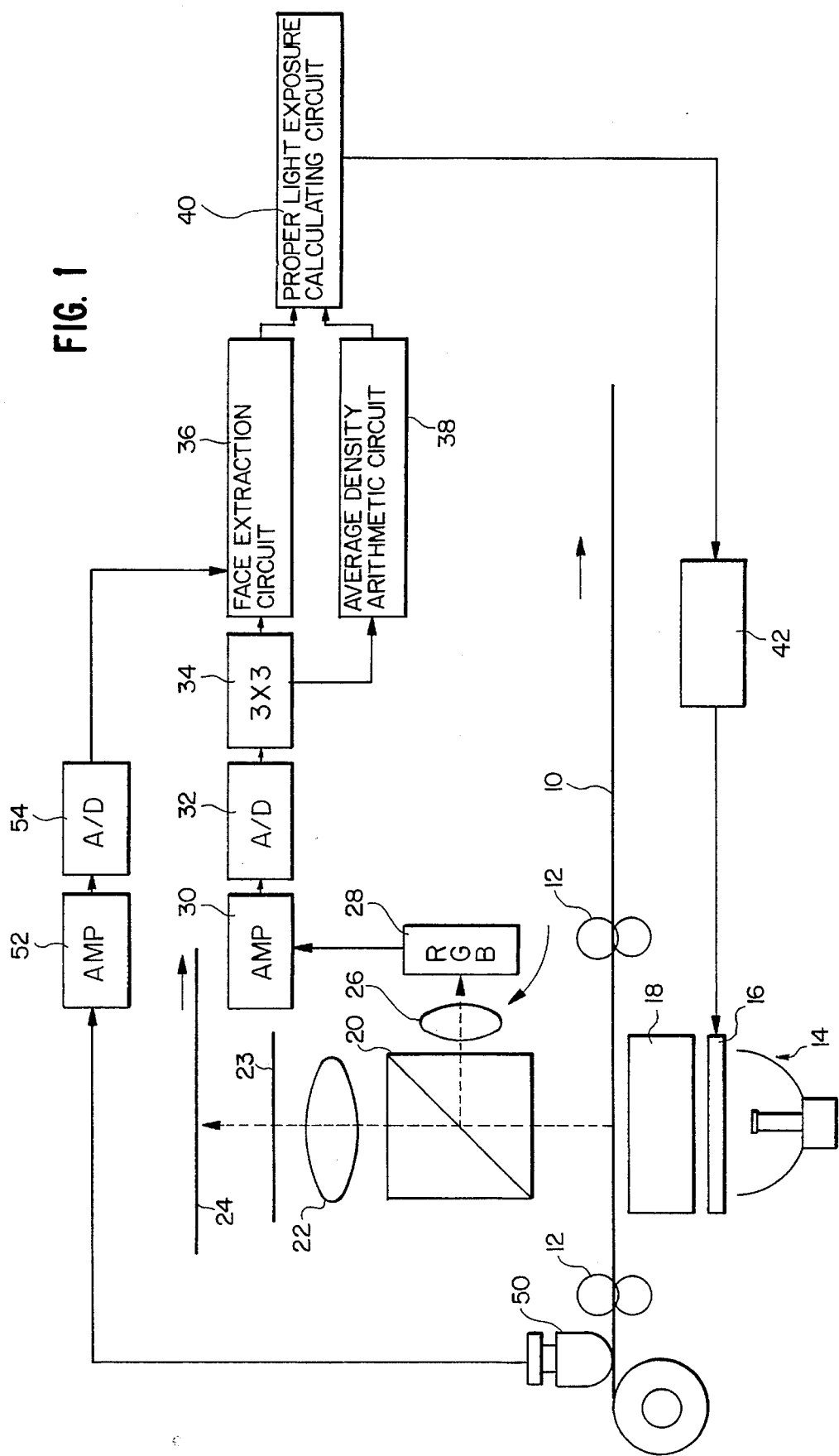
FIG. 1 is a schematic view showing an embodiment of a printer of the present invention.

As shown in FIG. 1, the auto-printer of the embodiment is provided with carrying rollers 12 for carrying a color negative film 10. A magnetic head 50 is provided in the upstream side of the carrying direction of the color negative film 10. The magnetic head 50 is arranged at a position where it is possible to read information at a photographing time which is recorded on the color negative film 10. The magnetic head 50 is connected to a face extraction circuit 36 through an amplifier 52 for amplifying an output of the magnetic head 50 and through an analog-to-digital (A/D) converter 54.

The color negative film 10 is carried by the carrying rollers 12. A light source 14, a color correcting filter 16 such as modulated light filter, and a diffusion box 18 are sequentially arrayed under the color negative film 10.

On the other hand, a distribution prism 20 is arranged above the color negative film 10 to distribute light transmitting through the color negative film 10 in two directions. A projection optical system 22, a black shutter 23 and a color paper (photographic paper) 24 are sequentially disposed across one optical path which is distributed in one of the directions by the distribution prism 20. A projection optical system 26 and CCD image sensor 28 are sequentially disposed across the other optical path.

The projection optical system 26 includes a zoom lens, and is set to have such a magnification that all the picture elements of an image frame 60 of the color negative film 10 can be photometrically measured by the CCD image sensor 28.

In the CCD image sensor 28, the entire one image plane (one frame) of the color negative film 10 is divided into many unit regions (for example, 512×512), and the respective unit regions are analyzed into three color light, i.e., R (red), G (green) and B (blue) for the photometry. The CCD image sensor 28 is connected to a 3×3 matrix circuit 34 which is used for correcting sensitivity of the CCD image sensor through an amplifier 30 for amplifying output of the CCD image sensor and through an analog-to-digital (A/D) converter The 3×3 matrix circuit 34 is connected to a proper light exposure calculating circuit 40 through the face extraction circuit 36. The face extraction circuit 36 includes a microcomputer in which a program having a routine as will be described later is stored. Further, the 3×3 matrix circuit 34 is connected to the proper light exposure calculating circuit 40 through an average density arithmetic circuit 38 which is used for calculating an average density of the entire one image plane. The proper light exposure calculating circuit 40 is connected to a color correcting filter 16 through a driver 42 which is used to drive the color correcting filter.

Camera information serving as information with reference to the color original image is magnetically recorded on the color negative film 10. The camera information is provided with a main image size information and a main image existence region information. The main image size information may include a main image size Z or a image magnification m. The main image size Z or the image magnification m can be found by the following expression (1) or (2) depending upon a standard length ZO (or width, for example, long diameter or short diameter of a face, or person's height) of a main object, a focal length f of a lens, a distance L from the lens to the object, and a distance F from the lens to an image formation point. The camera may find the main image size Z as the main image size information to record. Alternatively, the camera may find the image magnification m to record the obtained value so that the auto-printer can find the main image size Z. Otherwise, the respective values may be recorded to calculate the main image size Z in the auto-printer.

$$Z=ZO \cdot f/(L-f) \qquad (1)$$

$$m=f/(F-f) \qquad (2)$$

In the embodiment, the person's face for which subtle color reproduction is required is employed as the main image. However, the main image should not be limited to the person and may also be an image region for which a proper color reproduction is desired.

The main image existence region information, i.e., a person's face existence region in the embodiment can be specified depending upon a focus position information in a multipoint ranging apparatus or region information of a image region including the focus position. Therefore, the main image existence region may be found by the camera depending upon the focus position and the region information of the image region including the focus position to record the main image existence region. Further, an existence position and the region of the main image may be specified by reading the information recorded in the camera. Alternatively, the existence position and the region of the main image may be calculated by a printer depending upon the recorded information.

The camera information is magnetically recorded on the color negative film 10. However, the information may be recorded by any other means for recording information, and for example, the camera information optically recorded by using a bar code or an optical mark. When the information is optically recorded, a detector such as photoelectric sensor is arranged instead of the magnetic head so as to read the information. The detector outputs signals according to the information so that the information can be read depending upon the signals. Alternatively, the information may be stored in a storage medium such as LSI card or IC card without being recorded on the color negative film 10.

The operation of the embodiment will be described hereinafter. The color negative film 10 is positioned at a predetermined position in the auto-printer after processing. When a printing process is started, the image frame of the color negative film 10 to be printed is carried to a printing position. While carrying the color negative film 10, the magnetic head 50 is operated to read the information recorded on the color negative film 10 and to output a signal according to the read information. The output signal is amplified by the amplifier 52, and is converted into a digital signal by the A/D converter 54, and is input into the face extraction circuit 36.

The printing process is started after the image frame reaches the printing position. Light emitted from the light source 14 passes through the color correcting filter 16, the diffusion box 18 and the color negative film 10, and is distributed by the distribution prism 20. The light is then received by the CCD image sensor 28 through the projection optical system 26. At the time, the black shutter 23 is closed.

The CCD image sensor 28 is operated by receiving the light to divide the entire image plane into many unit regions so as to analyze the respective unit regions into three colors, i.e., R, G and B for the photometry. Consequently, a photometric data signal is output from the CCD image sensor 28. The photometric data signal is amplified in the amplifier 30 and is converted into a digital signal in the A/D converter 32. Sensitivity of the image sensor is corrected in the 3×3 matrix circuit 34. The photometric data signal is then input into the face extraction circuit 36 and the average density arithmetic circuit 38. The average density of the entire image frame is calculated in the average density arithmetic circuit 38.

As will be described later, the image frame 60 (see FIG. 4) is divided in the face extraction circuit 36 depending upon the face size Z recorded on the color negative film 10. One of the divided regions is defined as a photometric picture element (hereinafter, referred to as picture element) 62 (see FIG. 4). A cluster of unit regions are provided with one or more unit regions to form the picture element 62. Average photometric data of the cluster of the unit regions is defined as the photometric data of the picture element 62. Thus, a position of the person's face (the main image) in one image plane is estimated depending upon the photometric data and the camera information. Accordingly, three color photometric data (R, G and B) in the position estimated to be the face are output. The light exposure arithmetic circuit 40 is operated to calculate the light exposure depending upon the three color photometric data output from the face extraction circuit 36 and the average density found in the average density arithmetic circuit 38. Further, the light exposure arithmetic circuit 40 is operated to control the color correction filter 16 through the driver 42 and to open and close the black shutter 23 to perform the printing process.

When using the average density found in the average density arithmetic circuit 38, the corrected light exposure with respect to the average density can be obtained. If the corrected light exposure is unnecessary, the average density arithmetic circuit 38 is not always necessary. Therefore, the light exposure may be directly found depending upon the three color photometric data output from the face extraction circuit 36.

Average photometric data serves as data of the picture element formed by the cluster of unit regions. The average photometric data may be found by using output value output from an electric circuit without finding by calculating as described hereinbefore.

Experiments showed the inventor that at least 10×10 picture elements (length×width) are preferably provided to find a feature amount in the face region recorded on the color negative film 10 irrespective of the size of the face.

For example, 100 picture elements are required within a region of 3×3 mm$^2$ in order to extract the feature of the face having the size of 3 mm which is recorded on the color negative film 10 having a standard image frame size (35×24 mm). Therefore, the following number of picture elements are required for the photometry of the image frame 60 having the standard image frame size:

$$\{(35\cdot24)/(3\cdot3)\}\cdot100=9280$$

Similarly, the following number of picture elements are required to extract the feature of the face having the size of 1 mm:

$$\{(35\cdot24)/(1\cdot1)\}\cdot100=84000$$

The face region is extracted with the size of the picture element fixed to one unit region so as to perform the photometry even if the face has the size of 1 mm. Consequently, as the size of the face increases, the feature of the face is extracted from the photometric data in the photometry with unnecessarily fine picture elements. As a result, a process is increased in vain.

Thus, in the embodiment, a zoom ratio of the projection optical system 26 is set so as to obtain the desired number of picture elements for extraction of the feature of the face having the smallest size. After the face size Z is calculated depending upon the obtained camera information, the number of the unit region in one picture element is found such that the image region of the face has 10×10 picture elements. That is, when the face size Z is obtained, the number of picture elements NA in one direction of the image frame 60 is found by the following expression (3). Further, the found number of picture elements NA is used to find the number of unit region N in one direction contained in the picture elements 62 by the following expression (4). In the embodiment, the picture element 62 has the same number of longitudinal and lateral unit regions, and the size of the picture element 62 can be equally enlarged or reduced by increasing or decreasing the number of unit regions. Alternatively, the numbers of longitudinal and lateral unit regions in the picture element 62 may be varied.

$$NA=(J/Z)\cdot10 \qquad (3)$$

$$N=U/NA \qquad (4)$$

wherein J is a length of one side of the image frame 60, and U is the number of unit regions of the CCD image sensor 28 in the direction corresponding to the length of one side of the image frame 60 (512 unit regions in the embodiment). Decimal points of all the values are omitted to form natural numbers.

Figure 4:
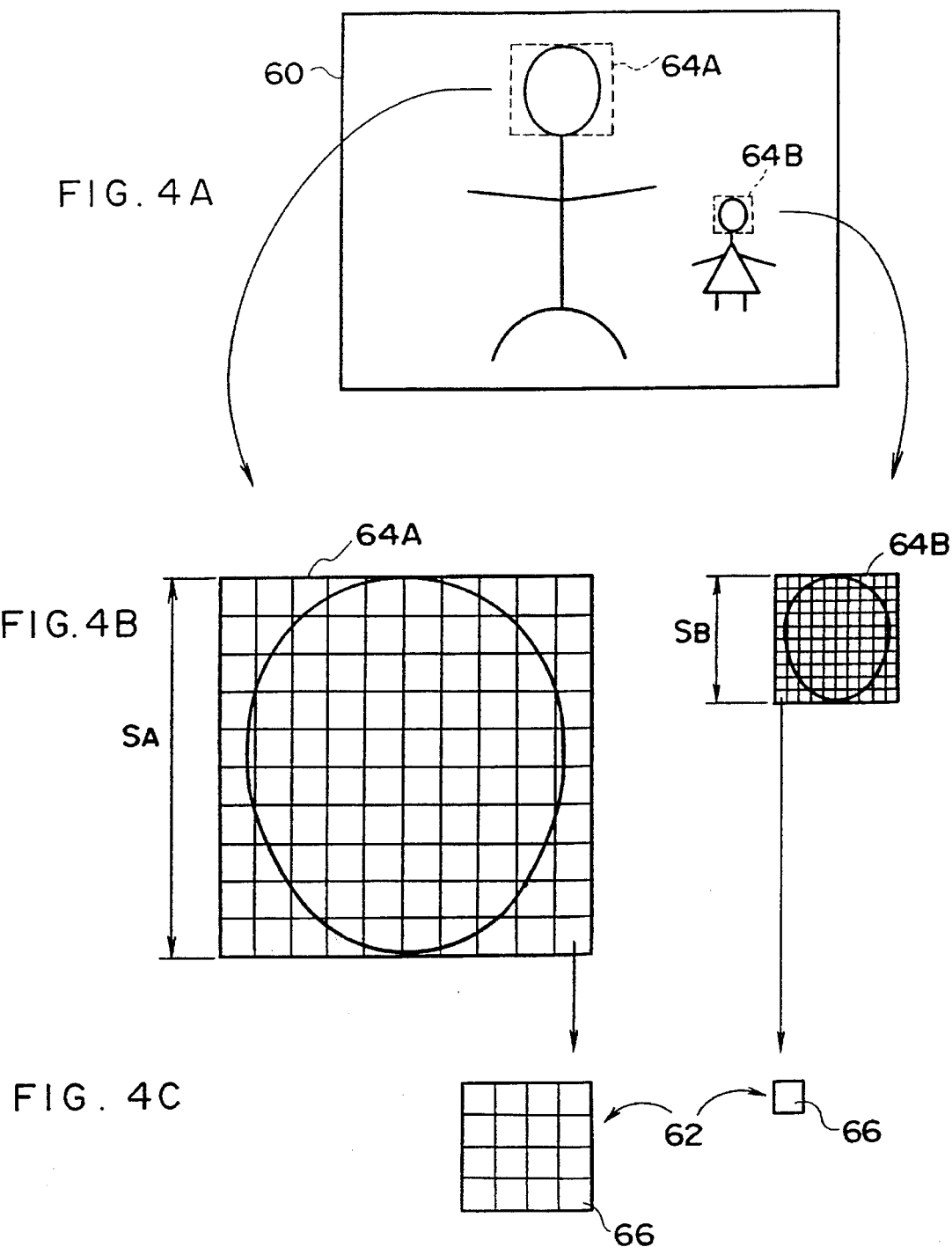
FIG. 4A is a chart showing an image frame which is an original image of a color negative film.
FIG. 4B is an enlarged view showing a face region which is extracted from a face portion of FIG. 4A.
FIG. 4C is an image diagram showing the number of unit region in one picture element during photometry.

FIG. 4 is an image diagram illustrating a process of determining the size of the picture element 62. For example, in case of the face region 64A having the size of 3 mm as shown in FIG. 4A, the face region 64A is divided into 10×10 (length×breadth) regions as shown on the left-hand side in FIG. 4B. Accordingly, one of the divided regions is defined as one picture element, and the number of unit region N in one direction can be found by the expressions (3) and (4). Thus, 4 is obtained as the number of the unit region N in one direction, and the one picture element 62 is formed by a cluster of unit regions having 16 unit regions as shown in FIG. 4C. If the average photometric data obtained from the picture element 62 is used as one photometric data, it is possible to obtain enough data to find the feature amount from the face region 64A as described hereinbefore. Similarly, in case the face has the size of 1 mm, the number of the unit region N is equal to 1, and enough data to find the feature amount can be obtained from the face region 64B.

Figure 2:
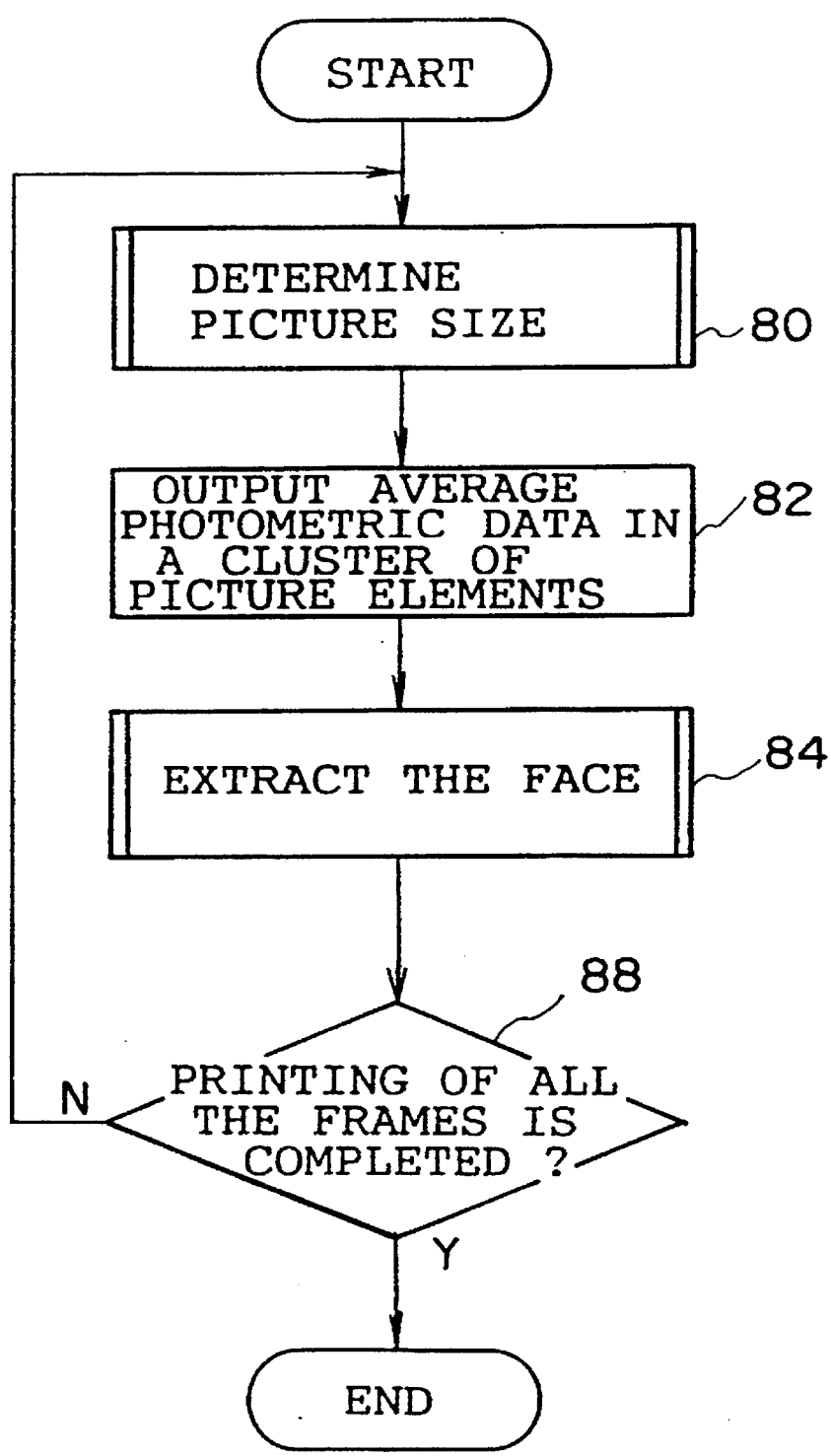
FIG. 2 is a flowchart showing a main routine of a face extraction circuit.

FIG. 2 shows a main routine of the face extraction process in the face extraction circuit 36. In Step 80, a size of the picture element 62 of the optimal image frame 60 is calculated depending upon the face size Z. Next, in Step 82, the average photometric data is calculated for each of the picture element 62 found in Step 80. In Step 84, the face is extracted depending upon the photometric data. In Step 88, it is decided whether or not the printing process of all the image frames 60 is completed. If it is decided that the printing process is completed, the routine is terminated.

Figure 3:
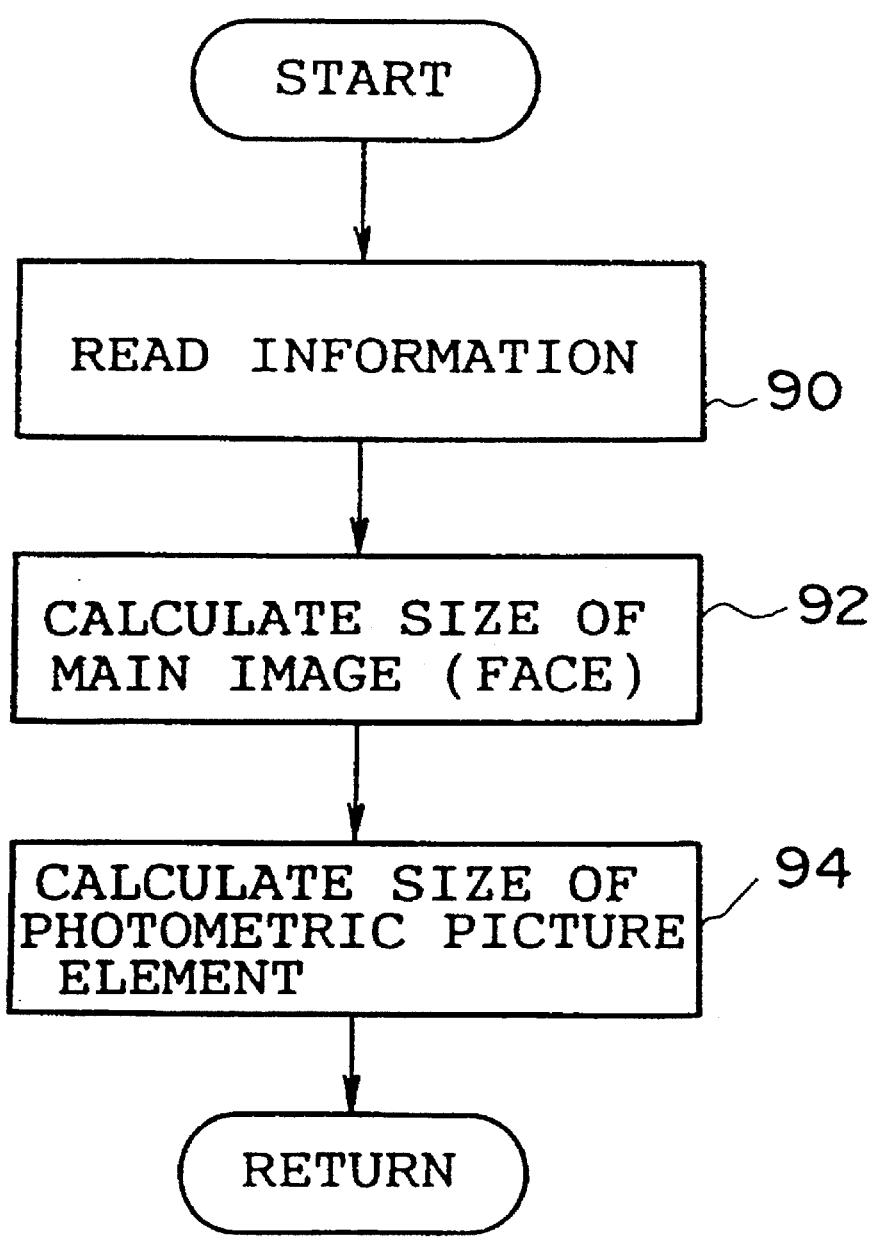
FIG. 3 is a flowchart showing details in Step 80 of FIG. 2.

Step 80 will be described in detail hereinafter. FIG. 3 shows details in Step 80. Namely, the camera information recorded on the color negative film 10 is read in Step 90. After completion of reading, the face size Z is calculated depending upon the expressions (1) and (2) in Step 92. After the calculation of the face size Z, the size of the picture element is calculated in Step 94 and the routine is terminated.

As noted above, the face region is virtually divided into 10×10 regions to provide one picture element by varying the number of the unit region of the picture element 62. However, the zoom ratio of the projection optical system 26 may be determined such that one of the unit region of the CCD image sensor can correspond to the one picture element, and 10×10 picture elements may be included in the face region.

Figure 5:
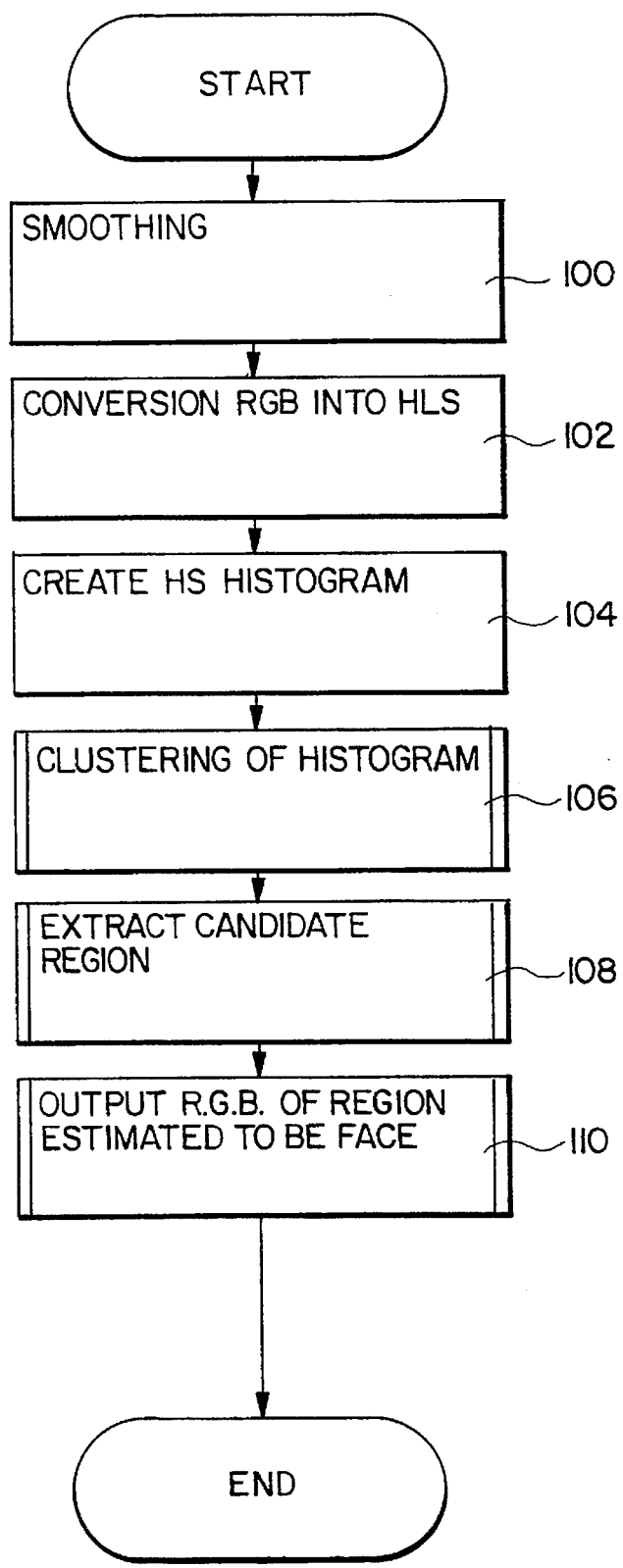
FIG. 5 is a flowchart showing a face extraction routine of the face extraction circuit.
Figure 6:
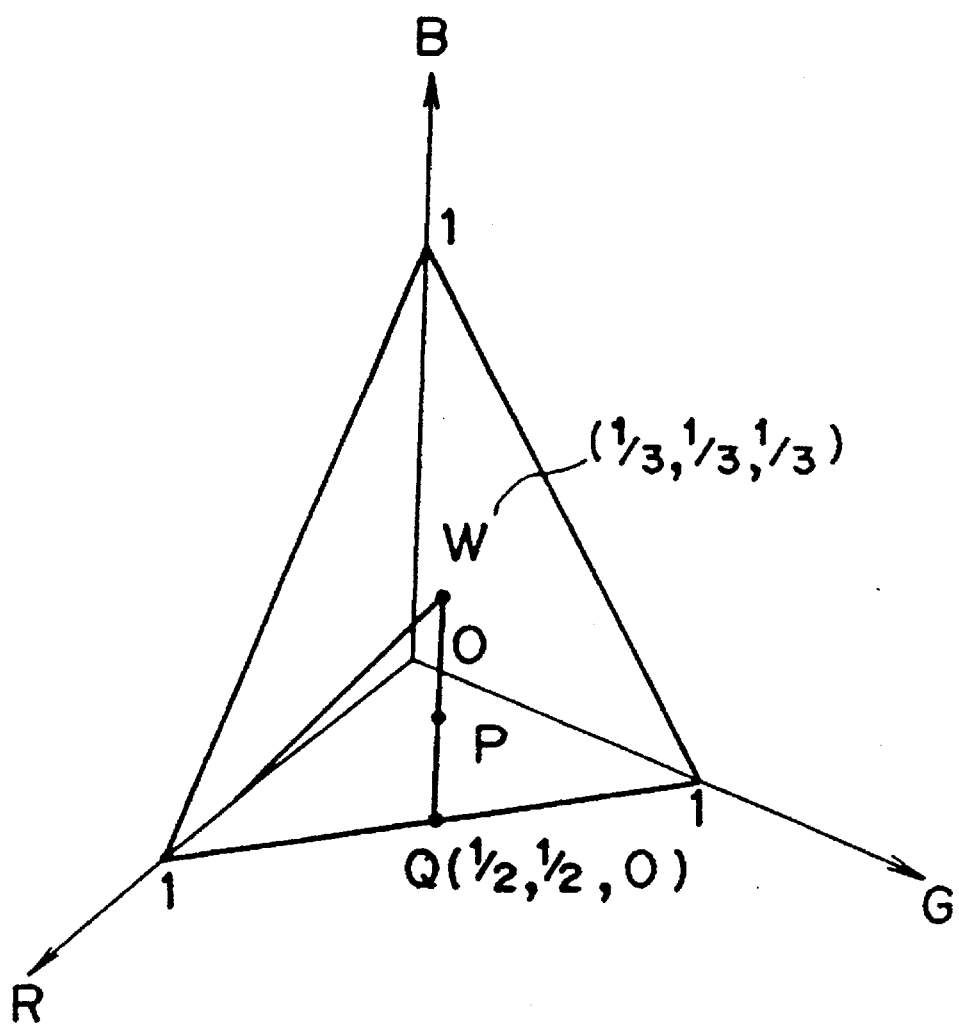
FIG. 6 is a chart showing color coordinates.

Referring now to FIG. 5, a description will be given of a face extraction routine in Step 84 as set forth above. In Step 100, noises are removed from the input three color photometric data, that is, smoothing is performed. In Step 102, the three color photometric data (R, B and G) are converted by the following expressions (5) to (7) into H (hue value), L (lightness value) and S (saturation value):

$$L=(R+G+B)/3 \quad (5)$$

$$S=1-min(r',g',b') \quad (6)$$

$$H=H'/2Pi \quad (7)$$

wherein R, G and B represent the three color photometric data which are standardized such that R, G and B have the respective minimums of 0 and the maximums of 1 as shown in a three-dimensional color coordinates, and min ( ) represent the minimum of value positioned in parentheses, and r', g' and b' represent r'=R/L, g'=G/L and b'=B/L, respectively. H' is given by the following expression (8), and Pi (i is any one of R, G and B) is equal to P in FIG. 6:

$$H' = \frac{Pi}{2} - \tan^{-1}\frac{x}{\sqrt{1-x^2}} \quad (8)$$

wherein $$x = \frac{2(R-L)^2 + (G-L)^2 + (B-L)^2}{\sqrt{6L(R-L)^2 + (G-L)^2 + (B-L)^2}}$$

In Step 104, a two-dimensional histogram in relation to the hue value and the lightness value is found by using a coordinate system including a hue value axis, a lightness value axis and a picture element number axis which are respectively arranged cross at right angle. In Step 106, the found two-dimensional histogram is divided for each crest as will be described later, that is, clustering of the two-dimensional histogram is performed. In Step 108, clustering of many picture elements are performed depending upon the crest of the two-dimensional histogram, for which the clustering is performed. The image plane is divided depending upon the clustering so that a candidate region for the person's face can be extracted from the divided regions. In Step 110, as will be described in detail later, the face region is estimated depending upon the extracted candidate region for the face region and the camera information. Further, the three color photometric data (R, G and B) of the region estimated to be the face are output to terminate the routine.

Figure 7A:
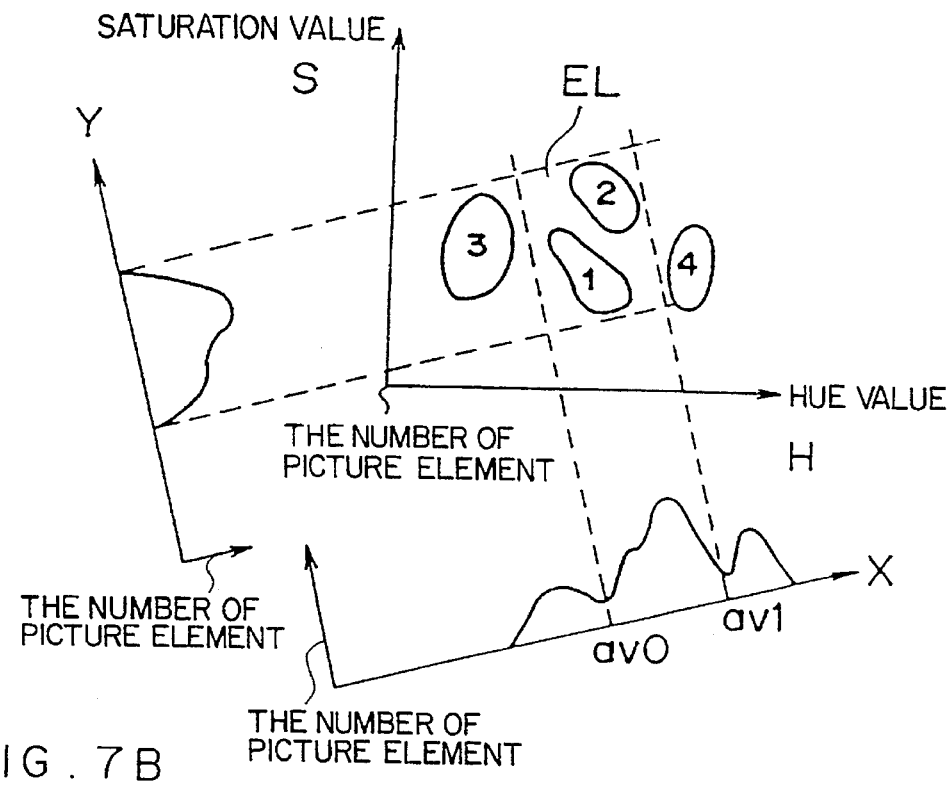
FIG. 7A is a chart showing a two-dimensional histogram with reference to a hue value and a saturation value.

Step 106 to Step 110 will be described in detail hereinafter. FIG. 8 illustrates details in Step 106. That is, in Step 120, a region to be evaluated is cut out of the two-dimensional histogram in relation to the hue value and the lightness value. For the sake of simplicity, an evaluation region is defined as one frame in FIGS. 7A–7C. In Step 122, it is decided whether or not there is the evaluation region. When no evaluation region is cut out in Step 120, that is, when evaluation of all the region is completed, there is no evaluation region. Thus, the routine is terminated. If there is the evaluation region, X and Y axes are determined to create a histogram for cutting out the crest in Step 124. That is, the evaluation region is rotated with an axis in parallel with the picture element number axis as a center of rotation. Further, position of the evaluation region is found such that the position is sure to have the maximum number of crests of the histogram and preferably has the sharpest crest as seen from side of the crest of the histogram. The X and Y axes are determined depending upon this position. If reduction of the process time is required, axes providing the maximum distribution of the histogram may be used as the X and Y axes though accuracy is reduced to some extent. In the embodiment of FIG. 7A, the position where the maximum number of crests can be surely seen and the sharpest crest can be preferably seen in case four crests marked 1 to 4 are vertically seen, is a position where three of the crests can be seen. Therefore, the X axis is determined in the direction perpendicular to the seen direction, and the Y axis is determined in the direction perpendicular to the X axis.

In Step 126, the two-dimensional histogram is projected onto the X and Y axes to create each one-dimensional histogram. In the embodiment of FIG. 7A, the crests marked 1 and 2 are overlapped as seen from the direction perpendicular to the X axis. Accordingly, three crests, i.e., the crest marked 3, the crests marked 1 and 2 and the crest marked 4 are observed in the one-dimensional histogram with respect to the X axis. Further, since the crests marked 1 to 4 are overlapped as seen from the direction perpendicular to the Y axis, one crest can be observed in the one-dimensional histogram with respect to the Y axis. In Step 128, the histogram is converted by the following expression (9) into a performance function H (a) to cut the crest out of the histogram with respect to the X axis depending upon the performance function:

$$H(a) = \Sigma \frac{2f(a) - f(a+x)f(a-x)}{x} \quad (9)$$

wherein f(a) is the number of picture element at a time when the value in the direction of the X axis (feature amount) is equal to a, and x is a displacement from the feature amount a.

That is, an average value T of the performance function H(a) is found to obtain a range (i.e., an existence range of trough and foot portion) less than or equal to the average value T of the performance function H(a). Subsequently, a position where the histogram is minimized within the range is defined as the trough or the foot portion of the histogram. Consequently, the histogram is cut out at the found trough or foot portion.

Figure 9:
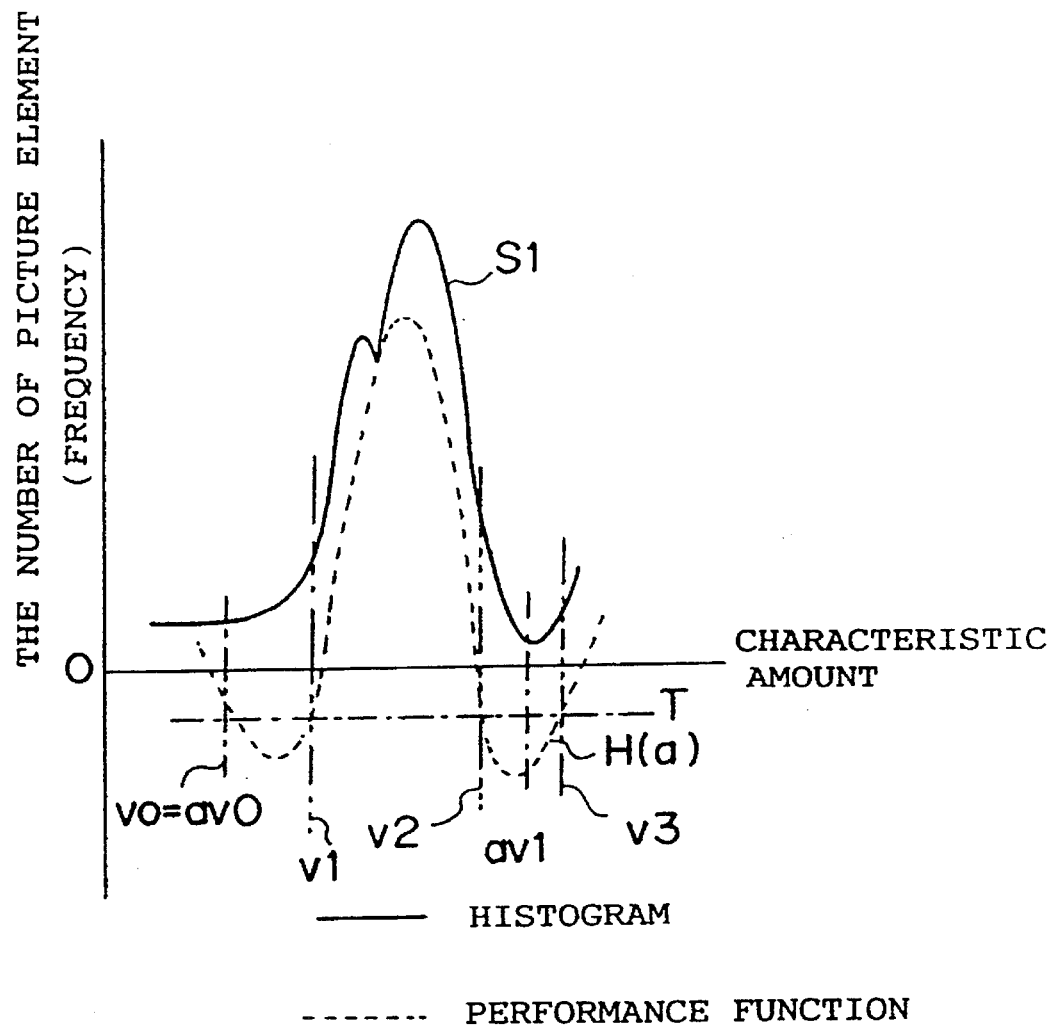
FIG. 9 is a chart showing a histogram and a performance function.

Cutting out the crest will be described hereinafter with reference to FIG. 9. The performance function H(a) could be described as shown in a broken line in the figure if the performance function H(a) is found from the histogram which is represented by an actual line SI. A range less than or equal to the average value T with respect to a negative portion of the performance function is equal to ranges having the feature amount of v0 to v1 and of v2 to v3. A position where frequency of the histogram within the range becomes minimized is av0=v0 in the range of v0 to v1, and is av1 in the range of v2 to v3. Further, the av0 is found as the foot portion, and av2 is found as the trough so that the histogram is cut out at these positions.

In Step 130, the crest of the histogram with respect to the Y axis is cut out as in the case of cutting out the crest of the histogram with respect to the X axis. In Step 132, a region where the crests of the one-dimensional histograms with respect to the X and Y axes cut out as described above are overlapped in the two-dimensional histogram, is found to cut the crest out of the two-dimensional histogram with respect to the hue value and the lightness value. A region E1 in FIG. 7A is one embodiment of the crest which is cut out as described above.

In Step 134, it is decided whether or not the crest cut out of the two-dimensional histogram has a single peak. If the crest does not have the single peak, Step 124 to Step 134 are repeated until the crest cut out of the two-dimensional histogram has a single peak. A region E2 in FIG. 7C is one embodiment of the crest having the single peak which is cut out as described above.

In Step 136, a process (labeling) is performed to provide a label so as to identify the cut out crest having the single peak. In Step 138, the labeled crest is masked and the process returns to Step 120. The steps as set forth above are repeated to divide all the regions of the two-dimensional histogram with respect to the hue value and the lightness value into the crest having the single peak.

Figure 10:
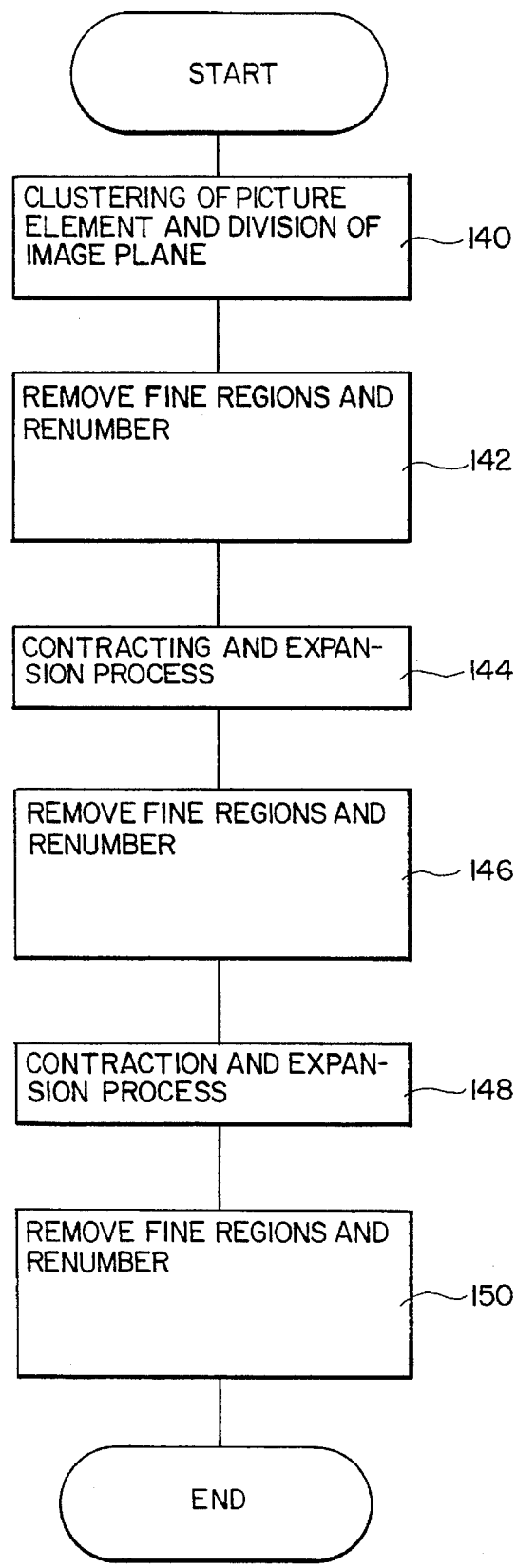
FIG. 10 is a flowchart showing details in Step 108 of FIG. 5.

FIG. 10 illustrates Step 108 of FIG. 5 in detail. That is, in Step 140, a range XR (see FIG. 7C) in the direction of the X axis and a range YR (see FIG. 7C) in the direction of the Y axis of the crest having the single peak which is divided as described above, are respectively found for each crest having the single peak. Further, it is decided whether or not the hue value and the lightness value with respect to each picture element of the original picture belong to these ranges. Accordingly, the clustering of the picture element is performed and the picture elements belonging to a range surrounded by the ranges XR and YR are collected. The original picture is then divided such that the collected picture elements can form one region on the original picture. In addition, the divided regions are numbered.

Figure 7B:
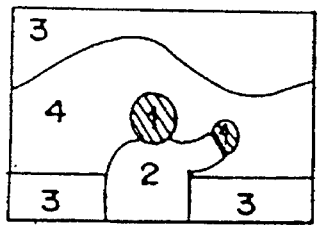
FIG. 7B is a chart showing a divided condition of the original image.
Figure 7C:
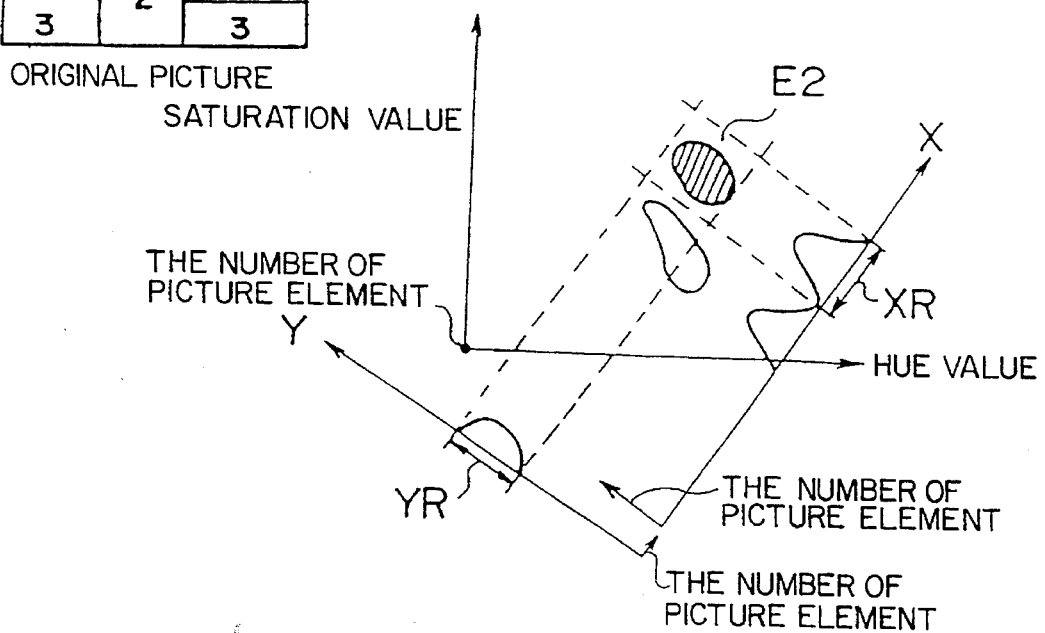
FIG. 7C is a chart showing a condition where a single crest is cut out of the two-dimensional histogram.
Figure 8:
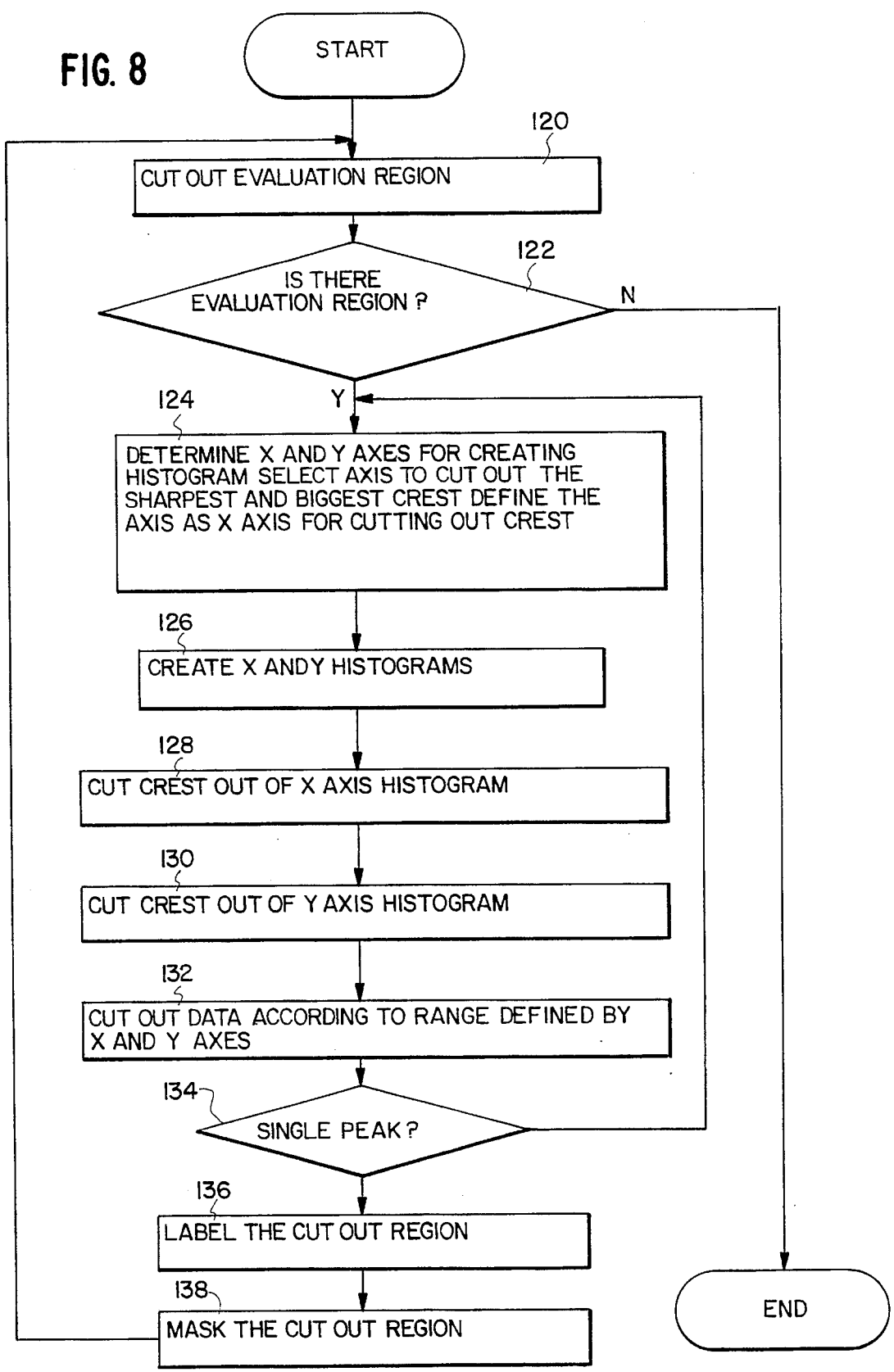
FIG. 8 a flowchart showing details in Step 106 of FIG. 5.

FIG. 7B illustrates one embodiment of the divided original picture. The picture elements of the respective regions marked 1 to 4 in FIG. 7A correspond to the picture elements contained in the crests having the single peak marked 1 to 4. The picture elements belonging to the same crest having the single peak in FIG. 7A are divided into various regions in FIG. 7B. This is because the picture elements have a hue value range and a lightness value range of the crest having the single peak in FIG. 7A and the regions, however, are divided in FIG. 7B.

In Step 142, fine regions are removed by deciding areas of the divided regions, and are renumbered. In Step 144, a contraction process is performed to delete all boundary picture elements on a boundary between the regions, and an expansion process is performed to multiply the boundary picture elements in the direction of a background picture element reverse to the contraction process. Thereby, small regions connecting to large regions are separated from the large regions. In Step 146, the fine regions are removed and renumbered as in Step 142. In Step 148, the contraction and expansion processes as described above are performed to separate regions which are weakly communicated with each other. In Step 150, the fine regions are removed as described above and are renumbered.

Figure 11:
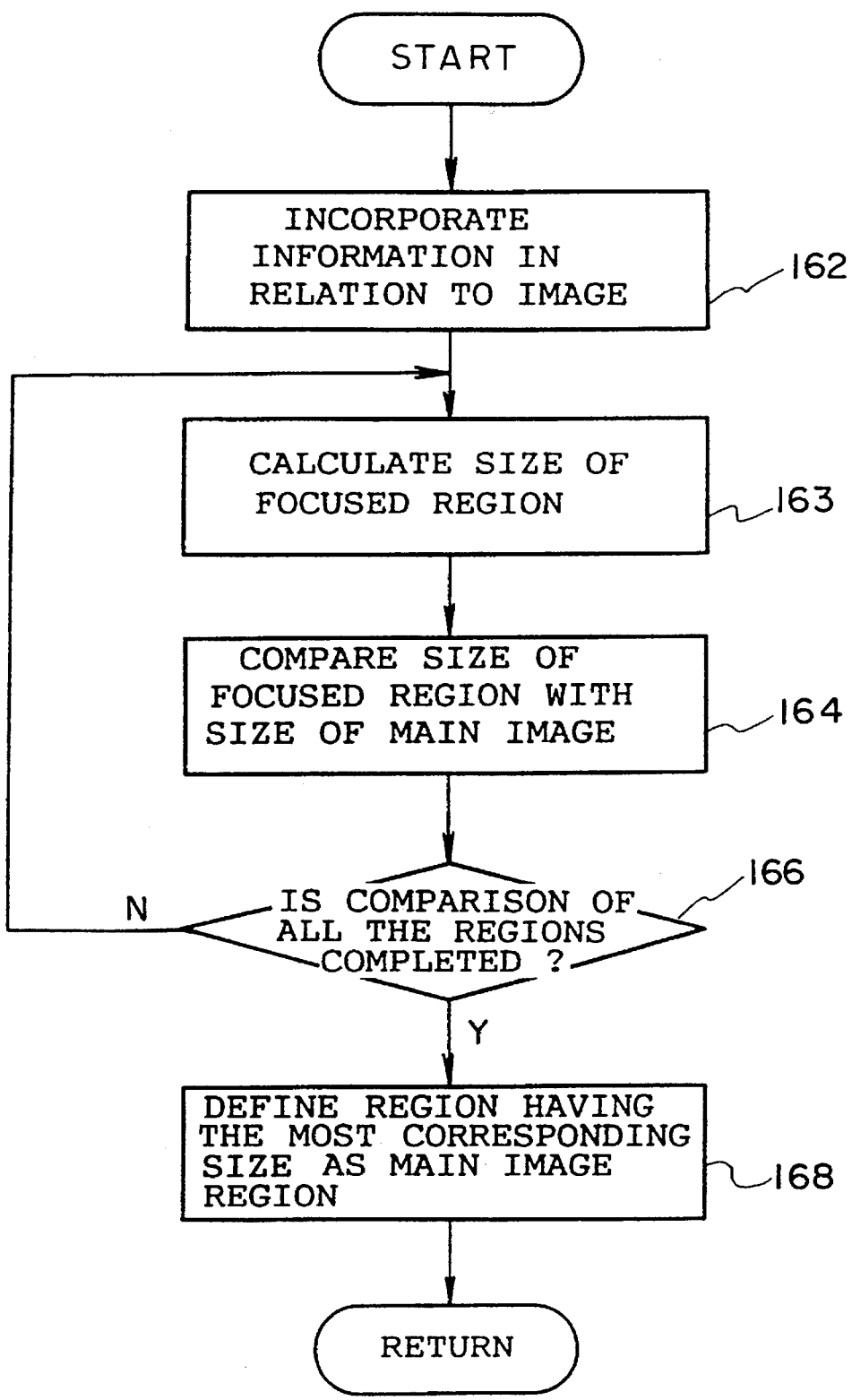
FIG. 11 is a flowchart showing details in Step 110 of FIG. 5.

FIG. 11 illustrates Step 110 in detail. In Step 162, the camera information recorded on the color negative film 10 corresponding to the original picture is incorporated to calculate the face size according to the expressions (1) and (2) as described above. The camera information includes the main image size information or the main image existence region information or the like as described above. In the embodiment, the size information of the main image (face) is used. Therefore, the face size is calculated according to the expressions (1) and (2) as shown above by using values for specifying the face size, i.e., a length of the face, a focal length of the lens and the like. A long diameter, a short diameter, an average value of the long and short diameters, a circumferential length or the like of the face may be used as the face size. If using the person's height, the face size is estimated depending upon the height.

After calculating the face size, in Step 163, one region is sequentially selected as a focused region from the regions which are extracted in Step 108, i.e., in the routine of FIG. 10. Further, a horizontal fillet diameter and a vertical fillet diameter of the focused region are calculated to find an image size of the focused region. Alternatively, the image size of the focused region may be found by the maximum length and the maximum vertical breadth of the focused region.

In Step 164, the found image size of the focused region is compared with the face size Z which is calculated depending upon the expression (1). In Step 166, it is decided whether or not the comparisons with respect to all the extracted regions are completed. If not completed, the comparison between the image size and the face size Z is repeated. When the comparisons of all the image size are completed, in Step 168, a region having the maximum compared value is defined as the image region of the face, and photometric data (R, G and B) in the defined region are output into the proper light exposure calculating circuit 40 (see FIG. 1). At the time, the ranges used to compare the image size may be set by using the main image existence region information. In such a way, it is possible to reduce the processing time to compare the image size.

As described hereinbefore, the photometric data (R, G and B) are output by using the average photometric data of the picture element including one or more unit regions which are defined depending upon the face size or the image magnification. Accordingly, even if the face has a large size, unnecessarily fine photometric data is not output but proper data is output.

As shown in FIG. 1, the proper light exposure calculating circuit 40 is operated to calculate the proper light exposure $E_i$ according to the following expression by using the photometric data (R, G and B) in the face region extracted by the face extraction circuit 36 as described above, and using the image average density $D_i$ (i is equal to one of R, G and B) per image frame calculated by the average density arithmetic circuit 38. The result is output into the driver 42. The driver 42 is operated to calculate a light exposure control value by using the proper light exposure $E_i$ to control the modulated filter 16.

$$logE_i = LM_i \cdot CS_i \cdot (DN_i - D_i) + PB_i + LB_i + MB_i + NB_i + K_1 + K_2 \quad (10)$$

wherein the respective symbols represent the following contents:

LM represents a magnification slope coefficient which is preset according to enlargement magnification defined by the kind of the color negative film and print size;

CS represents one of a color slope coefficient for under exposure and a color slope coefficient for over exposure which are respectively prepared for each kind of the color negative film, and any one of the color slope for the under exposure and the color slope for the over exposure is selected by deciding whether the average density of the frame to be printed is under or over with respect to a standard negative density value;

DN represents the standard negative density value;

D represents an average density value of a print frame;

PB represents a corrected balance value for a standard color paper, which is determined according to the type of the color paper;

LB represents a corrected lens valance value for a standard printing lens, which is determined according to the type of the printing lens;

MB represents a corrected value (master balance value) for variation of a print light source and changed development performance of a paper;

NB represents a negative balance (color balance) value determined by features of the color negative film;

$K_2$ represents a color correction amount;

$K_1$ represents a density correction amount expressed by the following expression:

$$K_a \left( \frac{D_R + D_G + D_B}{3} - \frac{FD_R + FD_G + FD_B}{3} \right) + K_b$$

wherein $K_a$ and $K_b$ are constants and FD is the average density of the face region.

The density correction amount $K_1$ of the expression (9) may be defined as a correction value which is found by a film testing apparatus, and the color correction amount $K_2$ may be expressed by using the average density of the face region as in the following expression:

$$(K_2)_i = Kc \left\{ \left( FD_i - \frac{FD_R + FD_G + FD_B}{3} \right) - \left( DN_i - \frac{DN_R + DN_G + DN_B}{3} \right) \right\}$$

wherein $K_c$ is a constant.

Further, the density correction amount $K_1$ of the expression (10) and the color correction amount $K_2$ may be defined as correction values which are found by the film testing apparatus. The average density $D_i$ of the print frame of the expression (10) may be replaced with the average density $FD_i$ of the face region to find the light exposure.

As set forth hereinbefore, in the embodiment, the face image region is decided by comparing the image size of the focused region with the face size found depending upon the camera information. Therefore, the face region can be properly estimated in a short time without estimating the face region depending upon all the image data. In addition, since probabilities of existence of the face and extraction of the face can be obtained by the camera information, it is possible to eliminate errors and waste of extraction time required for the region having low probability of existence of the face.

On the other hand, in the embodiment, it is possible to extract the face image region by the photometric data of the picture element having the size which is determined according to the face size on the color negative film 10. Accordingly, the face region can be accurately specified in a short time. Also, the size of the picture element, i.e., the size of photometric point formed with the optimal unit region number is determined according to the face size. Consequently, the proper photometric data can be obtained irrespective of the size of the main image of the color original image. As a result, it is possible to provide a printed image including enhanced reproducibility.

In the respective candidate regions extracted in Step 108, it may be decided whether or not the focused region is the face depending upon a shape and color information of the focused region, and depending upon a shape and color information of a vicinal region which is a region positioned in the vicinity of the focused region. For example, it is decided whether or not an extracted region in the vicinity of the focused region has the same or substantially same hue value and saturation value as the hue value and the saturation value of the focused region. Further, it is decided whether or not the extracted region in the vicinity of the focused region has the image size in the predetermined range of the focused region. Thereby, a range which is covered by the decision can be defined as a range where there is a person's body. The typical person's body is laterally symmetrical and vertically asymmetrical, and is continuously connected to the face. Therefore, it can be decided whether or not there is the region corresponding to the person's body by deciding whether or not there is the region continuously connected to the focused region and the region is laterally symmetrical and is vertically asymmetrical. A head portion is adjacent to the face, and is integrated with the face to form a substantially elliptical head. Further, typical head portion includes a hat and hair and the like so that the head portion has hue or lightness which is different from the hue or the lightness of the face. Accordingly, it is possible to decide whether or not there is the head portion by deciding the following several points with respect to the region adjacent to the focused region. First, it is decided whether or not a ratio of a circumferential length of the region to a boundary length of the adjacent portion which is adjacent to the focused region is more or equal to 30%. It is also decided whether or not the head portion has an improved degree of circular when integrating the focused region with the adjacent region. Further, it is decided whether or not a saturation value difference or a lightness value difference is larger than a hue value difference between the hue value of the focused region and the hue value of the region adjacent to the focused region. Finally, it is decided whether or not the region adjacent to the focused region has the saturation value or the lightness value less than the saturation value or the lightness value of the focused region.

Alternatively, it may be decided whether or not the region corresponding to the image size in a given range is the face. For example, the face region and the existence range of the face are distributed according to differences in height or the like between adults and children, and the direction of the face. Consequently, a plurality of images of standard face, a plurality of images of standard body and a plurality of images of standard head portion are stored in advance. As a result, it can be decided whether or not the focused region is the face by comparing the focused region with these standard images.

In the first embodiment set forth above, the photometric data of the one picture element formed with the determined number of the unit regions is defined as the average of the data which are obtained from the respective unit regions. However, data of typical unit region in the one picture element may be defined as the photometric data. Alternatively, data or average of a given number of unit regions may be defined as the photometric data.

Figure 13:
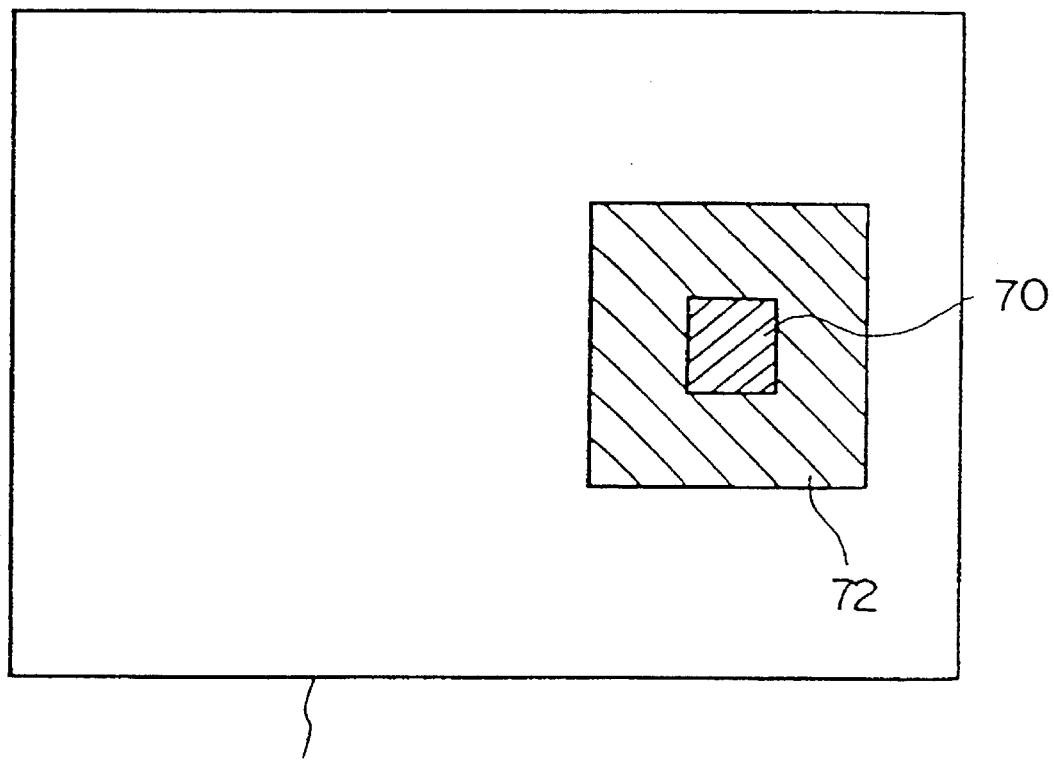
FIG. 13 is a chart showing a photometric area around a focus position in the image frame.

A description will be hereinafter given of the second embodiment of the present invention. In the embodiment, a photometric area is determined depending upon a focus position and an image magnification of a main image (in the embodiment, which is a person's face), and photometry is performed in the photometric area to perform a face extraction process. As shown in FIG. 13, information of a focus position 70 is read to arrange a photometric area 72 having a predetermined size in the vicinity of the focus position 70 according to the read information and the image magnification m in photographing. For example, the information about the focus position and the image magnification are recorded by a camera including a multipoint ranging type of auto-focus (AF) apparatus so as to use the information. Therefore, the photometric area 72 can be determined by the focus position and the image magnification.

Figure 12:
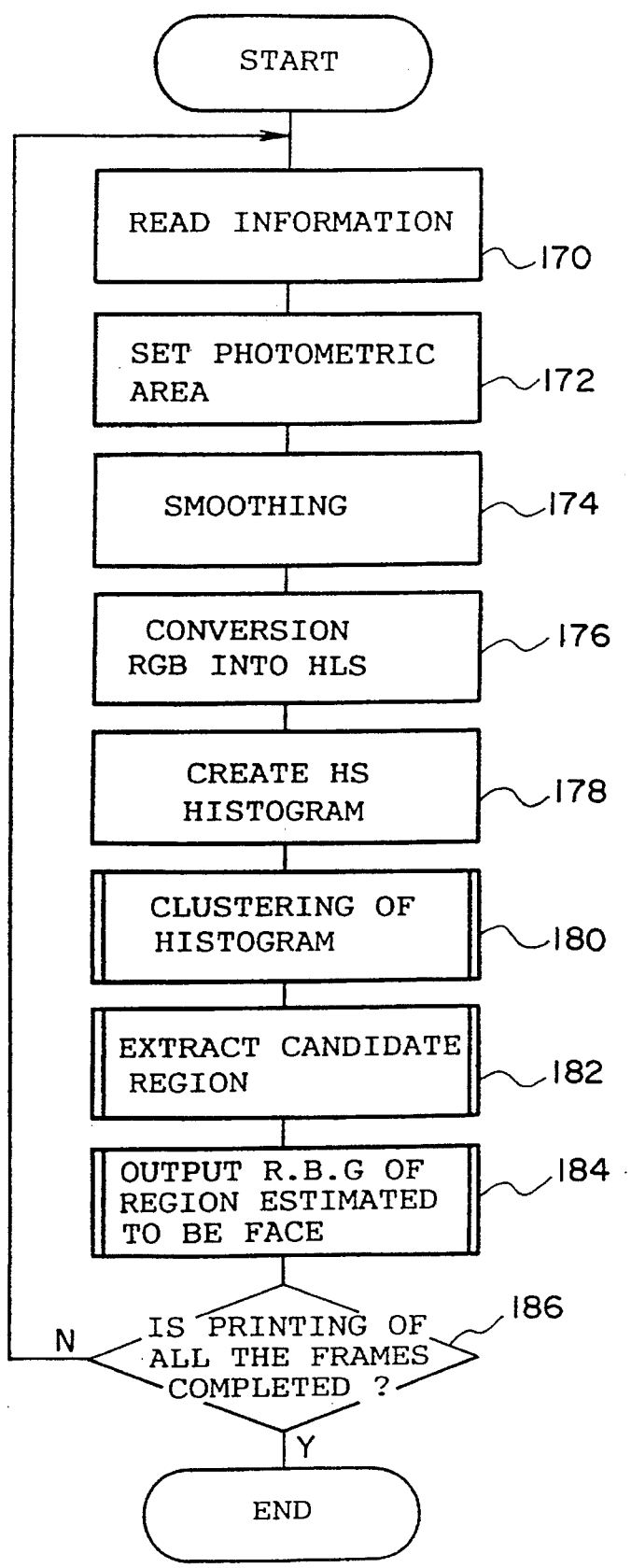
FIG. 12 is a flowchart showing a second embodiment of the face extraction routine of the face extraction circuit.

FIG. 12 illustrates a face extraction routine which is performed by a face extraction circuit 36. In Step 170, the camera information is read. In the embodiment, the camera information includes the focus position information in the multipoint ranging apparatus or main image existence region information as well as the size information employed in the first embodiment. In the second embodiment, the main image existence region information is, for example, the focus position in the multipoint ranging apparatus or an existence region information of the face containing the focus position. The focus position may be one or more positions. In Step 172, the photometric area 72 is set depending upon the camera information. That is, the photometric area 72 with the image magnification serving as reference is determined in advance, and is enlarged and contracted according to the image magnification m. At the time, the number of unit region forming a picture element 62 is increased and decreased according to the large or small size of the face as in the first embodiment.

In Step 174, noise of three color photometric data in the photometric area 72 is removed, i.e., smoothing is performed. In Step 176, the three color photometric data (R, G and B) are converted into H (hue value), L (lightness value) and S (saturation value) according to the expressions (5) to (7).

In Step 176, a two-dimensional histogram in relation to a hue value and a saturation value is found by using a coordinate system having the hue value axis, the saturation value axis and a picture element number axis which are respectively arranged cross at right angle. In Step 178, the found two-dimensional histogram is divided for each crest, that is, a clustering of the two-dimensional histogram is performed. In Step 180, clustering of many picture elements are performed depending upon the crest of the two-dimensional histogram for which the clustering is performed. In Step 182, an image plane is divided depending upon the clustering so that a candidate region for the person's face can be extracted from the divided regions. In Step 184, an image size of a region which is extracted as in the first embodiment is compared with the face size obtained from the camera information. Consequently, the region having the highest degree of accordance is estimated as the face region, and the three color photometric data (R, G and B) of the region estimated to be the face are output. In Step 186, it is decided whether or not printing of all the frame is completed. If it is decided that the printing is completed, the routine is terminated.

When the face has small size, the photometric area is varied (contracted), and the size of the picture element is reduced. That is, the number of the unit region forming the picture element as in the first embodiment is reduced. In the method, it is possible to extract an image region of the face with accuracy even if the person is small. Further, an extraction processing time is not varied according to the face size. On the other hand, when the face has a large size, the size of the picture element is enlarged. That is, the number of the unit region is increased to increase the area of the picture element for which the photometry can be performed at one time so as to perform the extraction process of the face. In such a way, it is possible to reduce a calculating time of the photometrical data of the region where there is the image of the face. As a result, the processing time can be reduced.

When the face has a fine size and it is calculated or decided that one picture element includes the unit regions which are less than the predetermined number (for example, one), the extraction of the region is stopped to determined the light exposure depending upon information of the entire image plane, i.e., average density found in an average density arithmetic circuit 38. In such a way, it is possible to avoid degradation of reproducibility of color caused by determining the light exposure depending upon less image information.

In the embodiment, the focused region is specified in the focus position and the region in the vicinity of the focus position to decide whether or not the focused region is the face. Accordingly, a proper face region can be specified, and an accuracy of determination of the region having the face can be improved. Further, since the person's face mainly exists in the vicinity of the focus position, the face region can be accurately specified, and the face can be specified without wasting the extraction time required for the region having a low probability of existence of the face.

In order to determined the region of the face, a processing range for extracting the face may be determined depending upon the focus position after the photometry. Alternatively, the size of the face and the size of the picture element may be .found as a function of the focal length of the lens with respect to a distance from the lens to an object.

When the position and the size of the face recorded on the color negative film are specified as described above, the picture element may be set to have the same region size as the size of the face, and the density of the face may be found depending upon the obtained photometric data.

Figure 14:
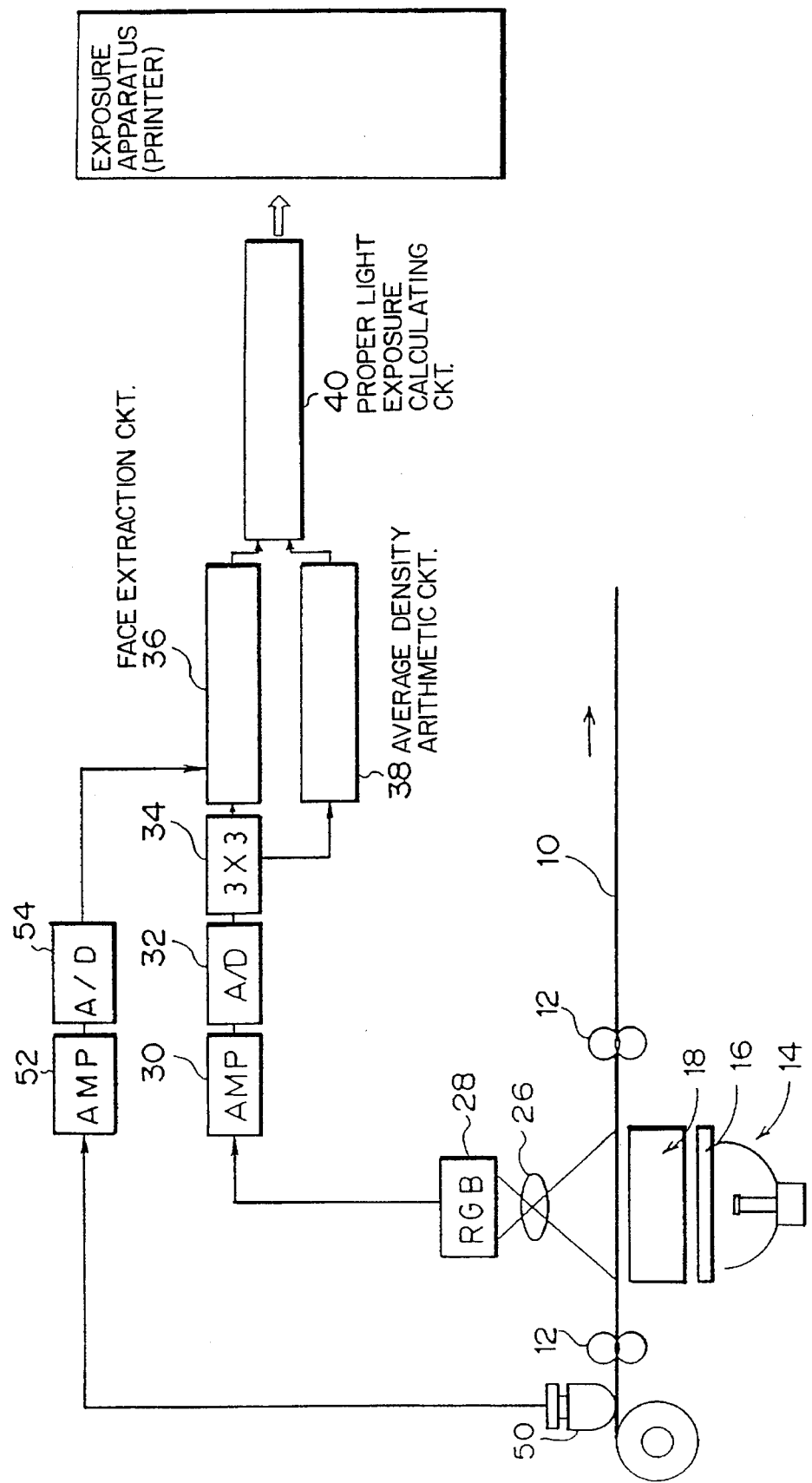
FIG. 14 is a schematic view of a light exposure arithmetic unit according to the present invention.

FIG. 14 illustrates a modified embodiment according to the present invention applied to a light exposure determining apparatus. The exposure determining apparatus is provided separately from a printer or a printer processor. The same reference numerals are used for elements in FIG. 14 as their counterparts in FIG. 1, and a description of the counterpart is omitted. Though the average density arithmetic circuit 38 is not always necessary, an integrating transmission density detecting circuit may be employed instead of the average density arithmetic circuit 38 to detect LATD of the entire image plane.

Figure 15:
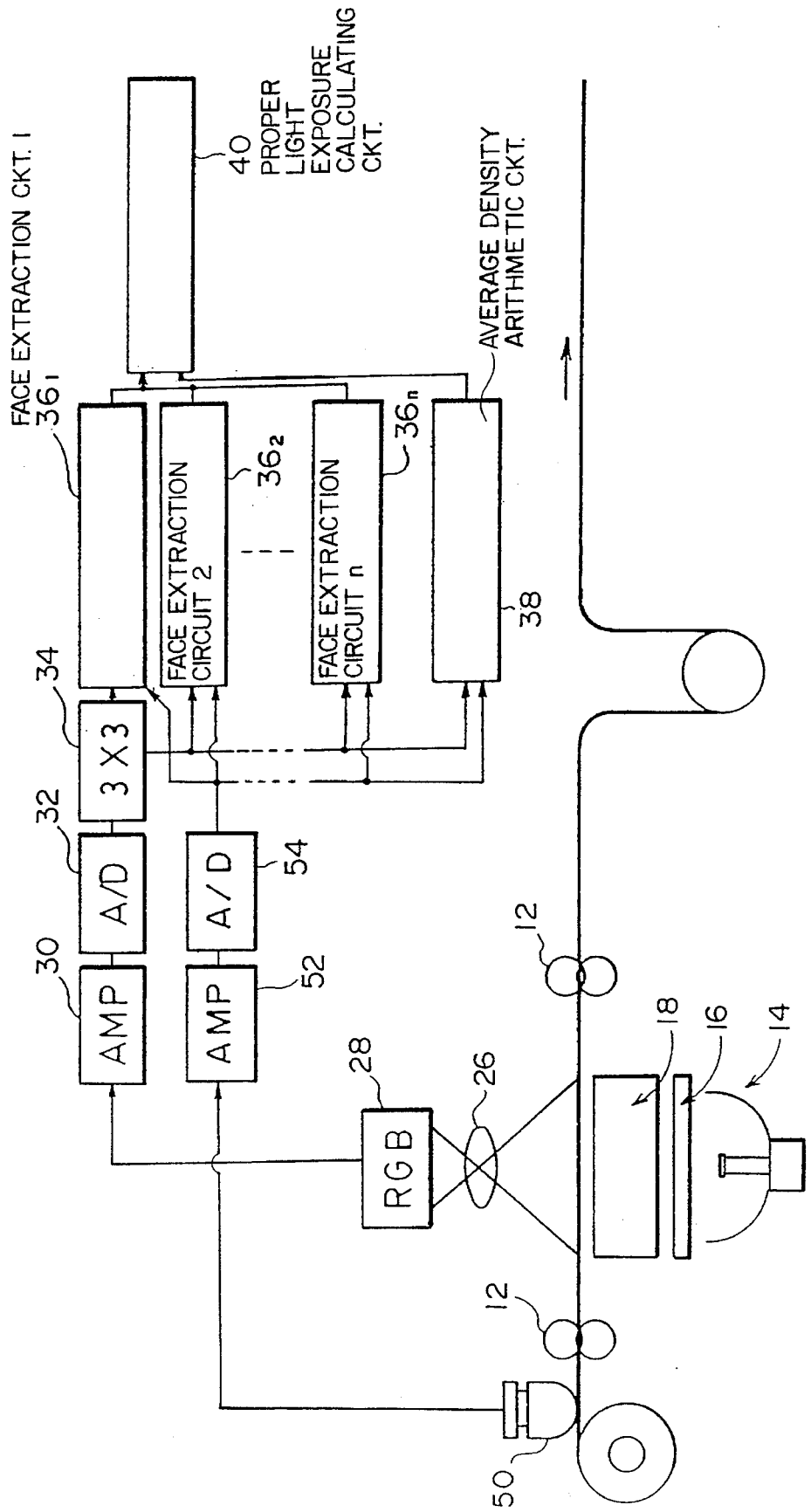
FIG. 15 is a schematic view of the light exposure arithmetic unit which is operated to perform a parallel processing by using the plurality of face extraction circuits.
Figure 16:
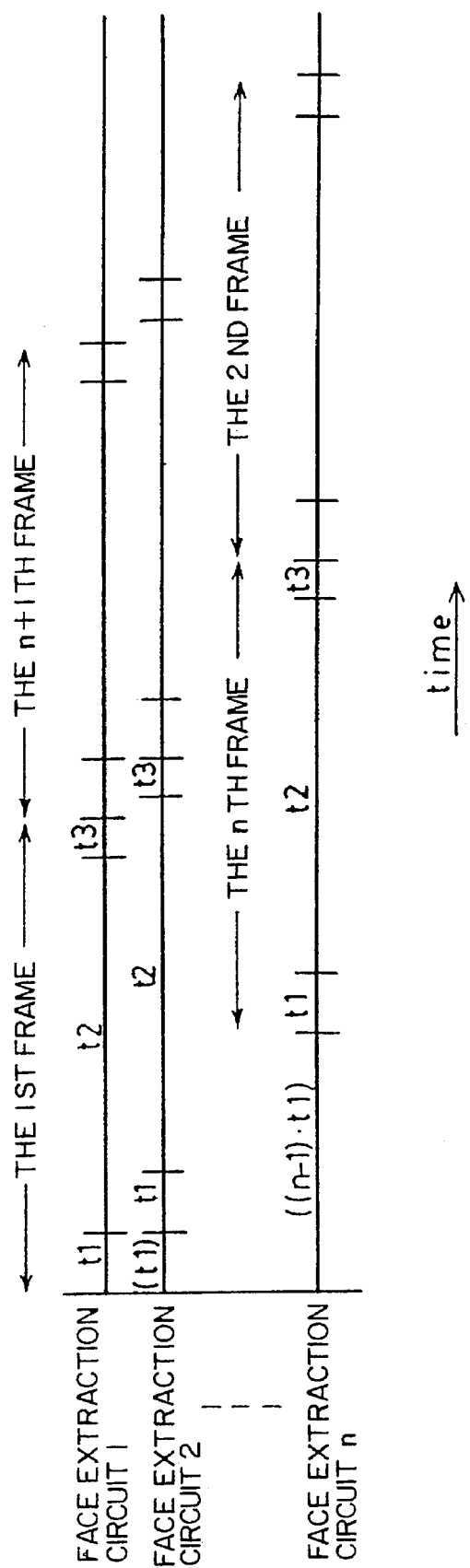
FIG. 16 is a chart showing a time chart of the parallel processing.

Referring now to FIG. 15, a plurality of face extraction circuits $36_1, 36_2 \ldots 36_n$ are employed instead of the face extraction circuit of FIG. 14, and the light exposure is calculated in a parallel processing. The face extraction circuits $36_1, 36_2 \ldots 36_n$ are operated to read the image, to calculate the light exposure, and to output the results according to a time chart of FIG. 16. In FIG. 16, $t_1$ is a image reading time for each frame, $t_2$ is a light exposure calculating time for each frame, $t_3$ is a transfer time of resulting light exposure for each frame, and $t_2$ is greater than $t_1$ and $t_3$. The face extraction circuit $36_1$ is operated to read the image of one frame for a time interval $t_1$, to calculate the light exposure for a time interval $t_2$, and to transfer a result for a time interval $t_3$. When an image reading of the one frame performed by the face extraction circuit $36_1$ is completed, a negative film is concurrently carried by one frame. Accordingly, the image reading of the one frame performed by the face extraction circuit $36_2$ is started. The light exposure calculation of the face extraction circuit $36_1$ and the image reading of the face extraction circuit $36_2$ are performed in parallel. The following operations are processed in parallel by the face extraction circuits $36_3, 36_4 \ldots 36_n$ as described above.

A time Tp required for processing m X n frame in parallel is expressed as follows:

$$Tp = m(t_1+t_2+t_3)+(n-1)t_i$$

On the other hand, a processing time Ts in case the parallel process is not performed is expressed as follows:

$$Ts = m \cdot n(t_1+t_2+t_3)$$

Therefore, it is possible to process at doubled high speed as shown in the following expression:

$$T_s/T_p = \frac{m \cdot n(t_1 + t_2 + t_3)}{m(t_1 + t_2 + t_3) + (n-1)t_1}$$

The parallel processor may be applied to the printer of FIG. 1.

The present invention may be applied to collection of the photometric data in light exposure determination for a digital color printer, in copy condition determination for a duplicator, as well as in the light exposure determination for a photo-printer. Similarly, the present invention may be applied to collection of the photometric data in exposure value determination for a camera, in display condition determination for a CRT image plane and in determination of amount of light in case creating a hard copy depending upon magnetic image data.

Further, in the present invention, it is possible to obtain the same effect as the embodiments by employing, for example, an indicating apparatus such as light pen or mouse to input and indicate a position of the main image region on a monitor having displayed image. The indicating apparatus is used for an apparatus which does not require high speed processing. Otherwise, in the embodiment, it is also possible to obtain the same effect as the embodiments by employing the reading apparatus for reading the information as described above instead of the indicating apparatus. The reading apparatus is used for an apparatus which should meet the high standards of quality.

As described hereinbefore, according to the present invention, it is possible to extract the main image of the color original image depending upon information in relation to the size of the main image. Therefore, there are several effects in that the calculation time required for extracting the main image can be reduced, the size of one picture element in the photometry of the color original image can be properly set according to the size of the main image, and color reproducibility of the obtained image can be improved.

Further, since the region having the main image can be specified depending upon the information in relation to the size of the main image, it is possible to provide an advantage of determining the main image with improved accuracy.

Moreover, there are some other effects in that it is possible to obtain probabilities of existence and extraction of the main image depending upon the information in relation to the size of the main image, to reduce a wasteful extraction time required for regions having low probability of existence of the main image region, and to eliminate an erroneous extraction of the image.

What is claimed is:

1. A method of determining light exposure comprising the steps of:

reading information in relation to a color original image and dividing said color original image into a plurality of picture elements to analyze respective ones of the picture elements with respect to three colors of light for photometry, said information in relation to said color original image being any one of size information representing a size of a main image and size related information for finding a size of said main image;

generating a histogram in relation to hue value depending upon data obtained from said photometry and dividing said histogram into portions each containing a crest of said histogram;

deciding to which of said crests said respective picture elements of said color original image belong so as to distribute each of said picture elements into a corresponding cluster, and analyzing said color original image for each cluster;

selecting a region of said color original image, which corresponds to said information, as a feature image region; and determining said light exposure for copy material depending upon photometric image data obtained from said feature image region.

2. A method of determining light exposure according to claim 1, wherein said is region information representing an image region where there is said main image.

3. A method of determining light exposure according to claim 1, wherein said information is information representing a focused position in said color original image.

4. A method of determining light exposure comprising the steps of:

reading information in relation to a color original image and dividing said color original image into a plurality of picture elements to analyze respective ones of the picture elements with respect to three colors of light for photometry, said information being at least one of size information representing a size of a main image and region information representing an image region in which said main image is formed, and said at least one of said size information and said region information being recorded or stored by a photographing apparatus during photography;

generating a histogram in relation to hue value depending upon data obtained from said photometry and dividing said histogram into portions each containing a crest of said histogram;

deciding to which of said crests said respective picture elements of said color original image belong so as to distribute each of said picture elements into a corresponding cluster, and analyzing said color original image for each cluster;

selecting a region of said color original image, which corresponds to said information, as a feature image region; and determining said light exposure for copy material depending upon photometric image data obtained from said feature image region.

5. A method of determining light exposure according to claim 4, wherein said photographing time information is recorded or stored in a recording apparatus provided for a photographing apparatus and/or a recording medium in which said color original image is recorded.

6. A method of determining light exposure comprising the steps of:

reading information in relation to a color original image and dividing said color original image into a plurality of picture elements to analyze respective ones of said picture elements with respect to three colors of light for photometry, said information being any one of size information representing a size of a main image and size related information for finding a size of said main image;

generating a two-dimensional histogram in relation to hue value and saturation value depending upon data obtained by said photometry and dividing said two-dimensional histogram into portions each containing a crest;

deciding to which of said crests said respective picture elements of said color original image belong so as to distribute each of said picture elements into a corresponding cluster, and analyzing said color original image for each cluster;

selecting a region of said color original image, which corresponds to said information, as a feature image region; and determining said light exposure for copy material depending upon photometric image data obtained from said feature image region.

7. A method of determining light exposure according to claim 6, wherein said information is region information representing a image region in which said main image is formed.

8. A method of determining light exposure according to claim 6, wherein said information in relation to said color original image is information representing a focused position in said focused color original image.

9. A method of determining light exposure according to claim 6, wherein said information in relation to said color original image is photographing time information which is at least one of size information representing size of a main image and region information representing an image region where there is said main image, and said at least one of said size information and said region information being recorded or stored by a photographing apparatus in photographing.

10. A method of determining light exposure according to claim 9, wherein said photographing time information is recorded or stored in a recording apparatus provided for said photographing apparatus and/or a recording medium in which said color original image is recorded.

11. A method of determining light exposure in which a color original image is divided into many picture elements, said picture elements are analyzed with respect to three colors of light by picture elements for photometry, and said light exposure for copying said color original image to copy material is determined depending upon photometrical image data, said method comprising the steps of:

determining a size of one picture element depending upon information in relation to a size of a main image so as to collect image data;

classifying said collected image data into one or more clusters having any one of a same or similar hue value, and the same or similar hue value and a same or similar saturation value;

finding an image feature amount from said image data of a region in a vicinity of each region of said color original image so as to correspond to each of said one or more clusters as classified;

determining a main image region from said found image feature amount; and determining said light exposure to copy material depending upon said image data of said determined main image region.

12. A method of determining light exposure according to claim 11, wherein said information in relation to the size of said main image is size information representing a size of a main object in said main image.

13. A method of determining light exposure according to claim 11, wherein said information in relation to the size of said main image is magnification information representing image magnification of a photographing optical system.

14. A method of determining light exposure according to claim 11, wherein said information in relation to the size of said main image is distance information representing a distance from a lens to an object in photographing.

15. A method of collecting photometric image data in which a color original image is divided into many picture elements, said picture elements are analyzed with respect to three colors of light by the picture elements for photometry to collect photometric image data, said method comprising the steps of:

determining a size of each picture element based upon information relating to a size of a main image; and collecting image data depending upon said determination.

16. A method of collecting photometric image data according to claim 15, wherein said information is size information representing a size of a main object in said main image.

17. A method of collecting photometric image data according to claim 15, wherein said information is magnification information representing image magnification of a photographing optical system.

18. A method of collecting photometric image data according to claim 15, wherein said information in relation to the size of said main image is distance information representing a distance from a lens to an object in photographing.

19. A method of determining light exposure comprising the steps of:

classifying a region having adjacent picture elements including similar color data as one cluster depending upon data obtained by photometry, and analyzing an original color image for each cluster;

selecting a region of said color original image, which corresponds to information of a main image of the color image;

estimating a main image size depending upon said information, and the steps of classifying, selecting, and determining are carried out only when said main image size is within a predetermined range of sizes; and determining said light exposure for copy material depending upon photometric image data obtained from said feature image region.

* * * * *